US012694419B2

(12) United States Patent   (10) Patent No.: US 12,694,419 B2

Oguchi   (45) Date of Patent: Jul. 28, 2026

(54) INFORMATION PROCESSING SYSTEM, INFORMATION PROCESSING DEVICE, INFORMATION PROCESSING METHOD, AND NON-TRANSITORY RECORDING MEDIUM

(71) Applicant: SATO HOLDINGS KABUSHIKI KAISHA, Tokyo (JP)

(72) Inventor: Kentaro Oguchi, Tokyo (JP)

(73) Assignee: SATO CORPORATION, Tokyo (JP)

( * ) Notice: Subject to any disclaimer, the term of this patent is extended or adjusted under 35 U.S.C. 154(b) by 75 days.

(21) Appl. No.: 18/267,305

(22) PCT Filed: Dec. 27, 2021

(86) PCT No.: PCT/JP2021/048472

§ 371 (c)(1),
(2) Date: Jun. 14, 2023

(87) PCT Pub. No.: WO2022/201716

PCT Pub. Date: Sep. 29, 2022

(65) Prior Publication Data

US 2024/0013243 A1     Jan. 11, 2024

(30) Foreign Application Priority Data

Mar. 25, 2021     (JP) ................................. 2021-052065

(51) Int. Cl.
*G06Q 30/06* (2023.01)
*G06Q 30/0204* (2023.01)
(52) U.S. Cl.
CPC ................................. *G06Q 30/0204* (2013.01)
(58) Field of Classification Search
None
See application file for complete search history.

(56) References Cited

U.S. PATENT DOCUMENTS 6,327,576 B1   12/2001  Ogasawara
2010/0007464 A1*  1/2010  McTigue ............. G06Q 10/087
340/10.1

(Continued)

FOREIGN PATENT DOCUMENTS

EP        3 021 271 A1     5/2016
JP     2002-140511 A     5/2002

(Continued)

OTHER PUBLICATIONS

Office Action issued in connection with Japanese Appl. No. 2021-052065 dated Oct. 8, 2024.

(Continued)

*Primary Examiner* — Alan Torrico-Lopez

(74) *Attorney, Agent, or Firm* — Foley & Lardner LLP

(57)   ABSTRACT

An information processing system includes: a user terminal carried by a user; and an information processing device being capable of communicating with the user terminal. The user terminal includes: a display, and a processor configured to: acquire product information on a product and expiration information on an expiration date of the product; and cause the display to show product inventory information on the user, which is acquired from the information processing device. The information processing device includes a processor configured to: acquire the product information and the expiration information, which are obtained by the user terminal, as product inventory information on the user, when the product has been paid for by the user, and provide the product inventory information on the user, which is acquired by the processor, to the user terminal based on a request from the user.

17 Claims, 20 Drawing Sheets

(56)                    References Cited

U.S. PATENT DOCUMENTS

| | | | |
|---|---|---|---|
| 2012/0101876 A1* | 4/2012 | Turvey .................. | G06Q 40/00 |
| | | | 705/14.1 |
| 2015/0379613 A1 | 12/2015 | Hu et al. | |
| 2016/0140526 A1 | 5/2016 | Cummins et al. | |
| 2016/0350709 A1 | 12/2016 | Taylor et al. | |
| 2017/0323162 A1* | 11/2017 | Jones ..................... | H04N 7/183 |
| 2020/0265486 A1* | 8/2020 | Sakayori ............ | G06Q 30/0283 |
| 2021/0073883 A1* | 3/2021 | Hino .................. | G06Q 30/0617 |
| 2022/0230217 A1* | 7/2022 | Wallace ............. | G06Q 10/0834 |
| 2023/0368134 A1 | 11/2023 | Kagami | |

FOREIGN PATENT DOCUMENTS

| | | | |
|---|---|---|---|
| JP | 2004-348445 A | 12/2004 |
| JP | 2011-021865 A | 2/2011 |
| JP | 2017-089913 A | 5/2017 |
| JP | 2020-021419 A | 2/2020 |
| JP | 2020-123306 A | 8/2020 |
| JP | 6813228 B1 | 1/2021 |
| JP | 2021-043597 A | 3/2021 |
| KR | 10-1303848 B1 | 9/2013 |
| KR | 10-1904750 B1 | 10/2018 |
| WO | WO-02/27581 A1 | 4/2002 |
| WO | WO-2019/065286 A1 | 4/2019 |

OTHER PUBLICATIONS

Extended European Search Report issued in EP Appl. No. 21933306.9 dated Aug. 12, 2024.
Office Action issued in connection with Japanese Appl. No. 2021-052065 dated Feb. 25, 2025.
Office Action issued in Taiwan Appl. No. 110148923 dated Sep. 22, 2025.

* cited by examiner

| USER ID | USER NAME | PAYMENT METHOD | | |
| --- | --- | --- | --- | --- |
| | | CREDIT CARD NUMBER | ELECTRONIC MONEY | ... |
| A001 | T.K. | xxxxxx  xxxxxx | | ... |
| A002 | M.M. | | xxxxxx  xxxxxx | ... |
| A003 | Y.T. | xxxxxx  xxxxxx | | ... |
| ⋮ | ⋮ | ⋮ | ⋮ | ... |

STORE USER DATABASE

FIG.2

| USER ID | PAYMENT ID | PAYMENT ISSUE DATE | PURCHASE CONTENTS | | | | |
| --- | --- | --- | --- | --- | --- | --- | --- |
| | | | PRODUCT ID | PRODUCT NAME | PRICE | NUMBER OF PIECES /QUANTITY | BEST-BY DATE |
| A001 | TS052 | 2021.9.11 16 : 50 | xxxxx | TOMATO C | 100 YEN | 2 | 2021.9.20 |
| | | | xxxxx | YOGURT B | 250 YEN | 1 | 2021.9.15 |
| | | | : | : | : | : | : |
| A002 | TS237 | 2021.9.8 10 : 02 | xxxxx | JAM G | 280 YEN | 1 | 2022.9.3 |
| | | | : | : | : | : | : |
| A002 | TS052 | 2021.9.3 13 : 25 | : | : | : | : | : |

PURCHASE RESULT DATABASE

FIG.7

USER ID : Z001

| PRODUCT ID | PRODUCT NAME | NUMBER OF PIECES /QUANTITY | BEST-BY DATE |
|---|---|---|---|
| xxxxx | PREPARED FOOD C | 200g | 2021.9.22 |
| xxxxx | TOFU F | 2 | 2021.9.28 |
| xxxxx | TOMATO C | 3 | 2021.9.30 |
| xxxxx | MILK | 1 | 2021.9.25 |
| ⋮ | ⋮ | ⋮ | ⋮ |

USER INVENTORY DATABASE

FIG.8

| INVENTORY MANAGEMENT APP | | | |
|---|---|---|---|
| MR./MS. J.S. AS OF AUGUST 20, 2021 | | | |
| PRODUCT ID | PRODUCT NAME | NUMBER OF PIECES /QUANTITY | BEST-BY DATE |
| xxxxx | BREAD Y | 6 | 2021.8.23 |
| xxxxx | PORK F | 350g | 2021.8.25 |
| xxxxx | SWEET POTATO | 10 | 2021.8.25 |
| xxxxx | CABBAGE | 2 | 2021.8.26 |
| ⋮ | ⋮ | ⋮ | ⋮ |

| USER ID | USER NAME | GROUP ID | VIEW PERMISSION | ... |
|---------|-----------|----------|-----------------|-----|
| Z001 | G.H. | G005 | G008 | ... |
| Z002 | L.T. | – | Z052 | ... |
| Z003 | C.U. | G013 | – – | ... |
| Z003 | A.S. | – | Z035 G123 | ... |
| ⋮ | ⋮ | ⋮ | ⋮ | ⋮ |

INVENTORY APP USER DATABASE

FIG.12

INFORMATION PROCESSING SYSTEM, INFORMATION PROCESSING DEVICE, INFORMATION PROCESSING METHOD, AND NON-TRANSITORY RECORDING MEDIUM

FIELD

The present invention relates to an information processing system, an information processing device, an information processing method, and a program.

BACKGROUND

Systems for managing food inventory at homes are conventionally known as methods for reducing food waste caused by discarding foods such as perishable foods, which have passed their best-by dates (for example, refer to Japanese Unexamined Patent Application Publication No. 2004-348445).

Japanese Unexamined Patent Application Publication No. 2004-348445 discloses a food management system including a POS system, an external terminal, and a home terminal. The POS system transmits purchased product information on each customer via a communication network. The external terminal allows operating the home terminal from the outside to acquire necessary information such as food inventory management information. The home terminal receives the product information sent from the POS system and transmits requested information to the external terminal in response to operation input from the external terminal.

BRIEF SUMMARY

Technical Problem

Unfortunately, the food management system disclosed in Japanese Unexamined Patent Application Publication No. 2004-348445, which is not designed to efficiently manage food items based on best-by dates, does not guarantee effectiveness on reduction in food waste. This food management system sets best-by dates to the same dates based on, for example, dates of purchasing foods. Thus, the actual best-by date of each food item is not reflected in the system, and it is difficult to efficiently manage food items.

In view of these circumstances, an object of the present invention is to efficiently manage products in stock based on expiration information on respective products.

Solution to Problem

An embodiment of the present invention provides an information processing system including a user terminal and an information processing device. The user terminal is carried by a user. The information processing device is capable of communicating with the user terminal. The user terminal includes a first acquisition unit and a display control unit. The first acquisition unit is configured to acquire product information on a product and expiration information on an expiration date of the product. The display control unit is configured to cause a display to show product inventory information on the user, which is acquired from the information processing device. The information processing device includes a second acquisition unit and a providing unit. The second acquisition unit is configured to acquire the product information and the expiration information, which are obtained by the user terminal, as product inventory information on the user, when the product has been paid for by the user. The providing unit is configured to provide the product inventory information on the user, which is acquired by the second acquisition unit, to the user terminal based on a request from the user.

Advantageous Effects

An embodiment of the present invention enables efficiently managing products in stock based on expiration information on respective products.

BRIEF DESCRIPTION OF DRAWINGS

FIG. 2 shows an example of data components of a store user database.

FIG. 7 shows an example of data components of a purchase result database.

FIG. 8 shows an example of data components of a user inventory database.

FIG. 10 shows an example of a screen of an inventory management application of the user terminal.

FIG. 12 shows an example of data components of an inventory app user database.

DETAILED DESCRIPTION

Figure 1:
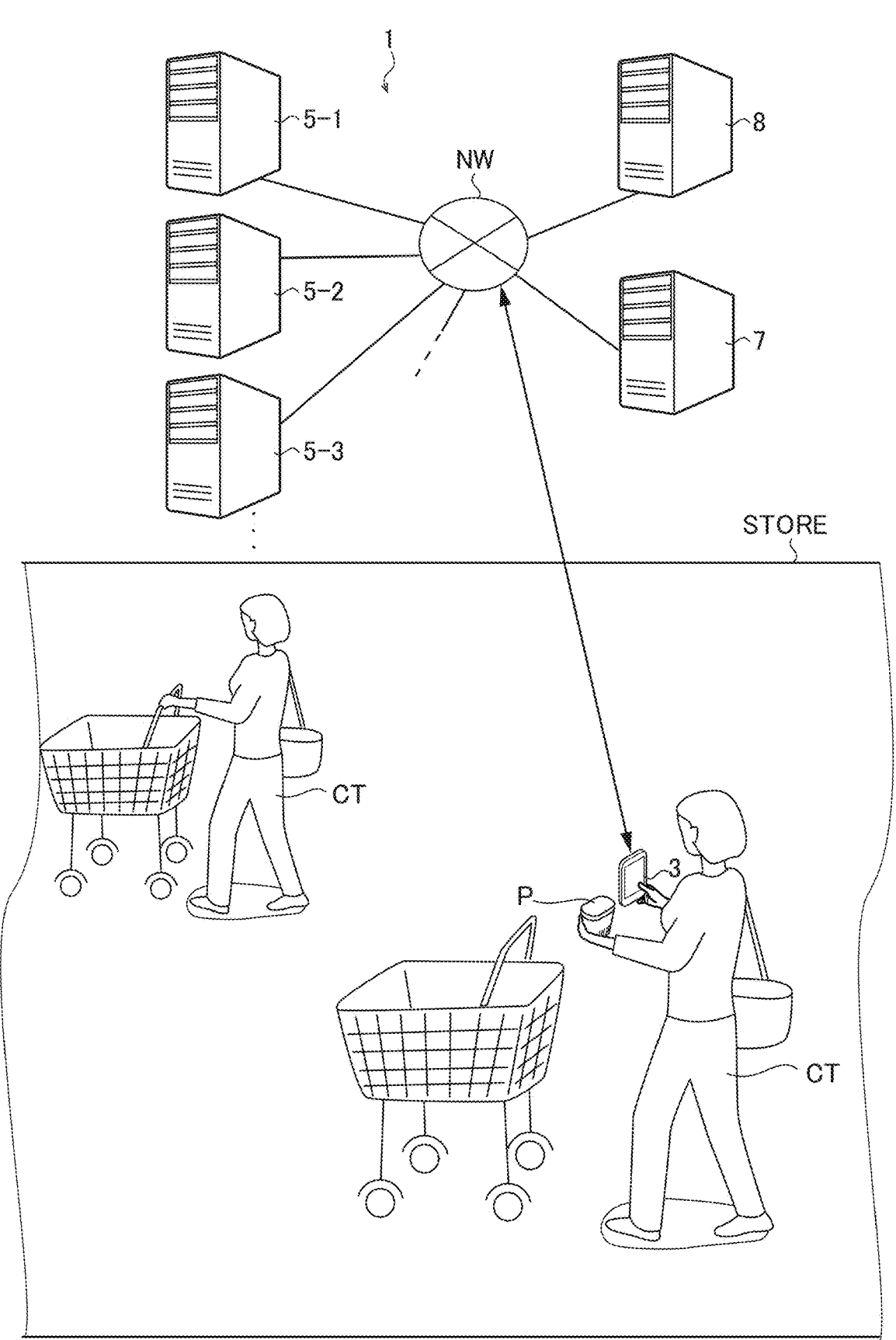
FIG. 1 schematically shows a system configuration of a product inventory management system of an embodiment.

In this disclosure, "product information" of a product means information for identifying the product. Examples of pieces of the product information include a product name, a product code, a product ID, and a product model. The product ID is identification information for identifying the product.

In this disclosure, "expiration information" of a product is information on an expiration date that indicates a reference whether a user can use, eat, or consume the product. Examples of the expiration date include a use-by date, a best-by date, a consume-by date, and a sell-by date.

In this disclosure, the method of obtaining product information and expiration information from a product is not limited, and various kinds of methods can be employed.

In one example in which code information corresponding to product information and expiration information is presented on a product, a shelf label, an electronic shelf label, or the like, the product information and the expiration information can be obtained by reading the code information. In another example in which textual information (human-readable text) corresponding to product information and expiration information is presented on a product, a shelf label, an electronic shelf label, or the like, a photographic image containing the textual information is obtained, and the textual information is obtained from this photographic image by image recognition technology. Herein, code information or textual information is shown on a product, such as by printing the code information or the textual information on a packaging material of the product, or attaching a label or other print medium, which is printed with the code information or the textual information, to the product itself or to a packaging material of the product. The code information may be a one-dimensional code (bar code) or a two-dimensional code.

The following describes an example of a case of obtaining product information and expiration information by reading code information shown on a product.

A product inventory management system of an embodiment allows inventory management of products stocked at home by a user, for example, by using a user terminal carried by the user.

Although the kinds of products are not limited, any products that are associated with the expiration information and that can be stocked at home by a user, can be used. Typical products include food items, seasonings, etc., which can be purchased in a retail store by a user.

For example, a user terminal obtains product information and expiration information by reading code information shown on a product in a store or the like. In one example in which a user terminal has a function for allowing payment without using a cash register, payment for a product corresponding to product information obtained by the user terminal is made by a store server that is capable of communicating with the user terminal. In the product inventory management system of an embodiment, an inventory management server acquires product information and expiration information corresponding to a product already paid for, from a store server, as product inventory information on a user, and it provides the product inventory information, for example, to a user terminal. That is, for a product that has been paid for, this system utilizes product information and expiration information corresponding to the product, which is obtained in purchasing by a user terminal or the like, as product inventory information. Thus, a user can manage inventory of products that the user has purchased by himself or herself, based on product information and expiration information contained in code information shown on the products. Here, in managing the products that the user has purchased, it is not necessary for the user to input consumption information and expiration information on the products.

(1) First Embodiment

A system configuration of a product inventory management system 1 of this embodiment will be described with reference to FIG. 1.

The product inventory management system 1 allows a user to manage inventory of products that are purchased in a store or the like and are then stocked at the user's home. The following describes food items as examples of products; however, the kinds of products are not limited, and any products such as seasonings, which have best-by dates (an example of expiration information), can be used. In the example of this embodiment, the store is a retail store such as a supermarket, which deals with foods having best-by dates, etc., as products. The system enables a user to complete payment without using a cash register in each store.

As shown in FIG. 1, the product inventory management system 1 of this embodiment includes a user terminal 3 that is carried by a user CT who does shopping in a store, store servers 5-1, 5-2, 5-3, and ..., a payment agent server 7, and an inventory management server 8. The product inventory management system 1 allows a user CT in home to manage inventory of products that are purchased in the store. In the product inventory management system 1, the user terminal 3 and the server group are capable of communicating with each other via a network NW. The network NW is, for example, the Internet, a local area network (LAN), or a wide area network (WAN), but not limited to them.

The store servers 5-1, 5-2, 5-3, and ... are provided so that each of a plurality of stores used by a user can provide a payment service without using a cash register. In the following description, when a matter that applies to each store server is described, the store server is simply represented by a "store server 5" as appropriate. The store server 5 is capable of communicating with the payment agent server 7 and supports a user to pay for products without using a cash register.

The user terminal 3 that is carried by a user CT is installed with a store application corresponding to each store. The store application communicates with the store server 5 of a corresponding store to settle payment without using a cash register in the corresponding store.

The user terminal 3 is installed with an inventory management application for managing inventory of products of a user. The inventory management application communicates with the inventory management server 8 to manage inventory of a user. The inventory management server 8 acquires information on products already paid by a user, from each of the store servers 5-1, 5-2, 5-3, and ..., and it provides inventory data (described later) of the user in response to a request from the inventory management application.

In the following description and in the attached drawings, the store application and the inventory management application are respectively abbreviated as "store app" and "inventory app," as appropriate.

The store server 5 stores a store user database, as shown by an example in FIG. 2.

Each record of the store user database illustrated in FIG. 2 includes a value of each of these fields: "USER ID," "USER NAME," and "PAYMENT METHOD." Herein, the value in the "USER ID" field is identification information assigned to a user of a store. The value in the "USER NAME" field is acquired based on input operation of a user and is recorded in the store user database at the time the user installs the store application in the user terminal 3. The value in the "PAYMENT METHOD" field is acquired based on input operation of a user and is recorded or updated in the store user database at the time the user installs the store application in the user terminal 3 or at any time after the store application is installed.

The value in the "PAYMENT METHOD" field is data necessary to receive a payment for products from a user, which is, for example, one or both of information on a credit card number and information on electronic money (e.g., a prepaid number). The value in the "PAYMENT METHOD" field is provided to the payment agent server 7 when a user of a corresponding user ID makes a payment.

Figure 3:
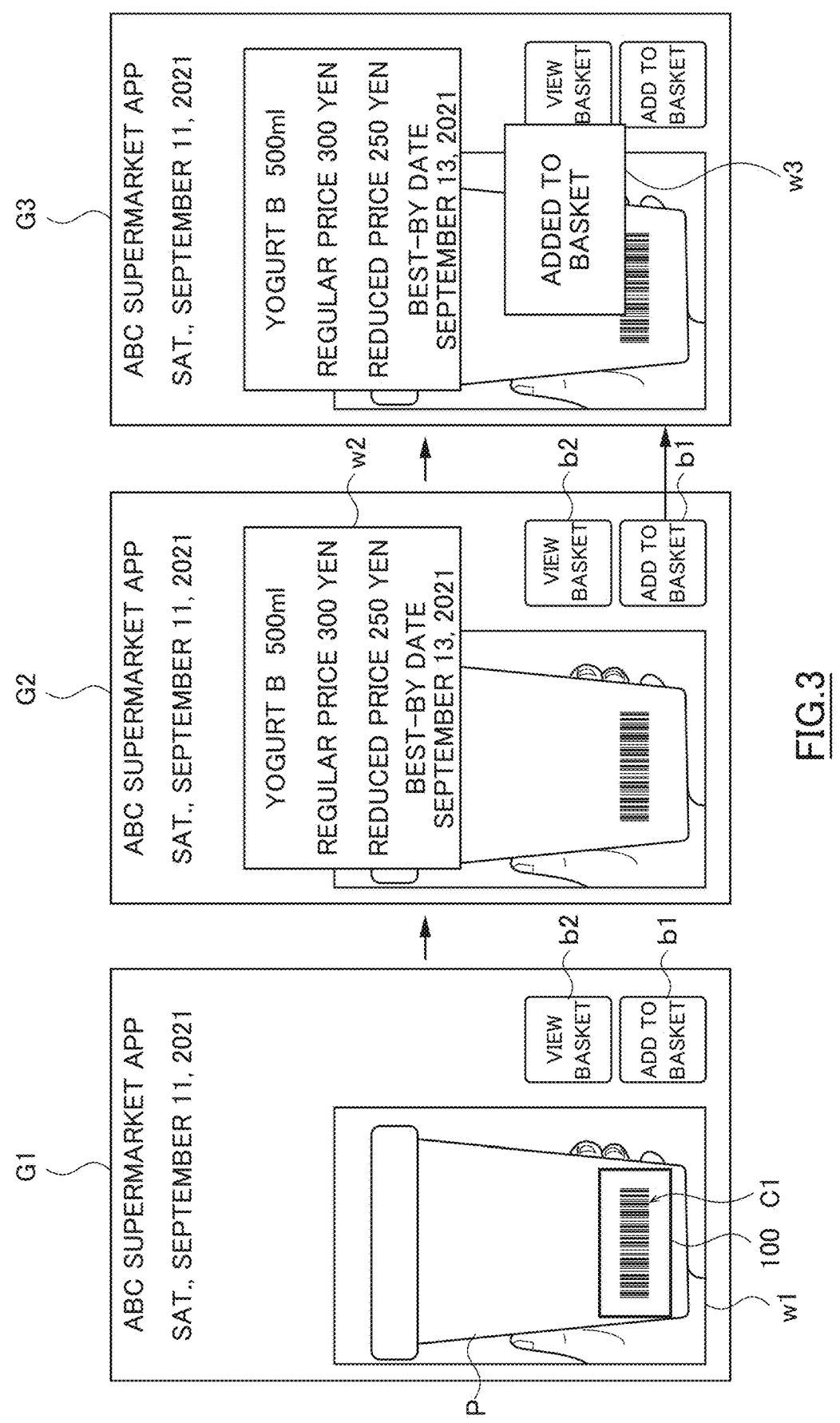
FIG. 3 shows an example of screen transition of a store application of a user terminal.
Figure 4:
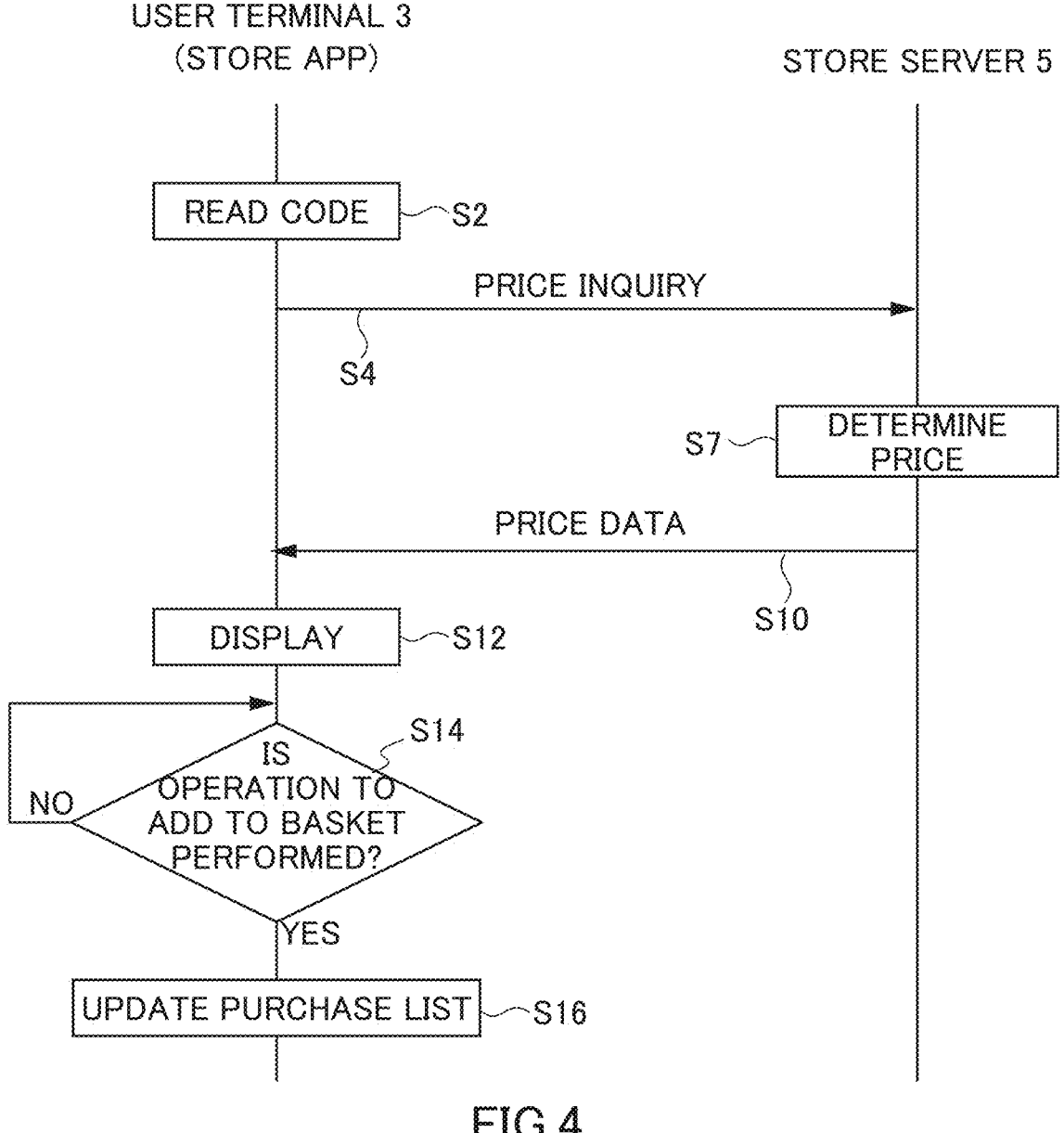
FIG. 4 is a sequence chart showing operation of the product inventory management system of an embodiment.

Next, a method of using the store application of the user terminal 3 will be described with reference to FIGS. 3 and 4. FIG. 3 shows an example of screen transition of the store application of the user terminal 3. FIG. 4 is a sequence chart showing processing of the store application of the user terminal 3.

A user who executes the store application can check an offered price of each product in a store and can make a payment for products that the user has selected by himself or herself. Screens G1 to G3 in FIG. 3 show a method for a user to use the store application in order to check the price of a product and add the product to a purchase list (basket).

When a user activates the store application on the user terminal 3, an imaging function equipped on the user terminal 3 is triggered, and an obtained photographic image is displayed in a window w1, as shown in the screen G1 in FIG. 3. In the screen G1, the window w1 contains an image of a product "P" in the state in which the user is holding it so as to show code information C1 thereon after picking it up from a shelf in a store. Displaying the code information C1 of the product "P" in the window w1 (that is, scanning performed by the user) causes the store application to read (scan) the code information C1 (step S2 in FIG. 4). In order to reliably read target code information even when a plurality of pieces of code information appear in the window w1, the imaging function of the user terminal 3 preferably includes a function of displaying a scan area 100 in the window w1. In this case, only code information C1 appearing in the scan area 100 is read among a plurality of pieces of code information in the window w1.

For example, the code information C1 contains information on a product ID (an example of product information) and a best-by date (best-by date information; an example of expiration information) of a corresponding product "P." Any type of code that contains a product ID and best-by date information can be used for the code information C1. For a bar code (one-dimensional code), CODE128, such as GS1-128, can be employed. The CODE128 enables bar coding all 128 characters of ASCII code, and thus, a bar code can be made so as to include a product ID and best-by date information.

A label that contains a GS1-128 code may be attached to each product in a store by automatically attaching labels in a batch with the use of an attaching robot or the like in a distribution center. In addition, a weight label containing a GS1-128 code may be attached in producing precooked foods or the like in a store. This procedure enables attaching a label that is printed with a GS1-128 code containing best-by date information, also to a product on which a code (e.g., JAN13) not containing best-by date information is directly printed.

After the code information C1 is read, the store application transmits an inquiry about an offered price of the product "P" for the user, which includes the product ID and the best-by date information contained in the code information C1, to the store server 5 (step S4 in FIG. 4). The store application then receives price data containing information on a regular price and an offered price of the product "P" from the store server 5 (step S10) and displays the price data (step S12).

In one example, with reference to FIG. 3, a window W2 in the screen G2 is displayed in step S12 and contains information on a product name ("YOGURT B 500 ml"), a regular price ("300 YEN"), an offered price ("250 YEN"), and a best-by date ("Sep. 13, 2021"), which corresponds to the product ID.

The user can select whether to add the product "P" to the purchase list (basket), by looking at the information contained in the window w2 in the screen G2. In order to add the product "P" to the purchase list, the user operates a button b1 ("ADD TO BASKET") displayed on the screen G2 (step S14 in FIG. 4; YES). Then, the screen G3 appears, and the user is notified of the addition of the product "P" to the purchase list (window w3). In this state, the user puts the picked-up product "P" in an actual basket or shopping cart of the store.

In response to operation to the button b1, the user terminal 3 updates the purchase list by adding information on a target product to the purchase list (step S16).

Figure 5:
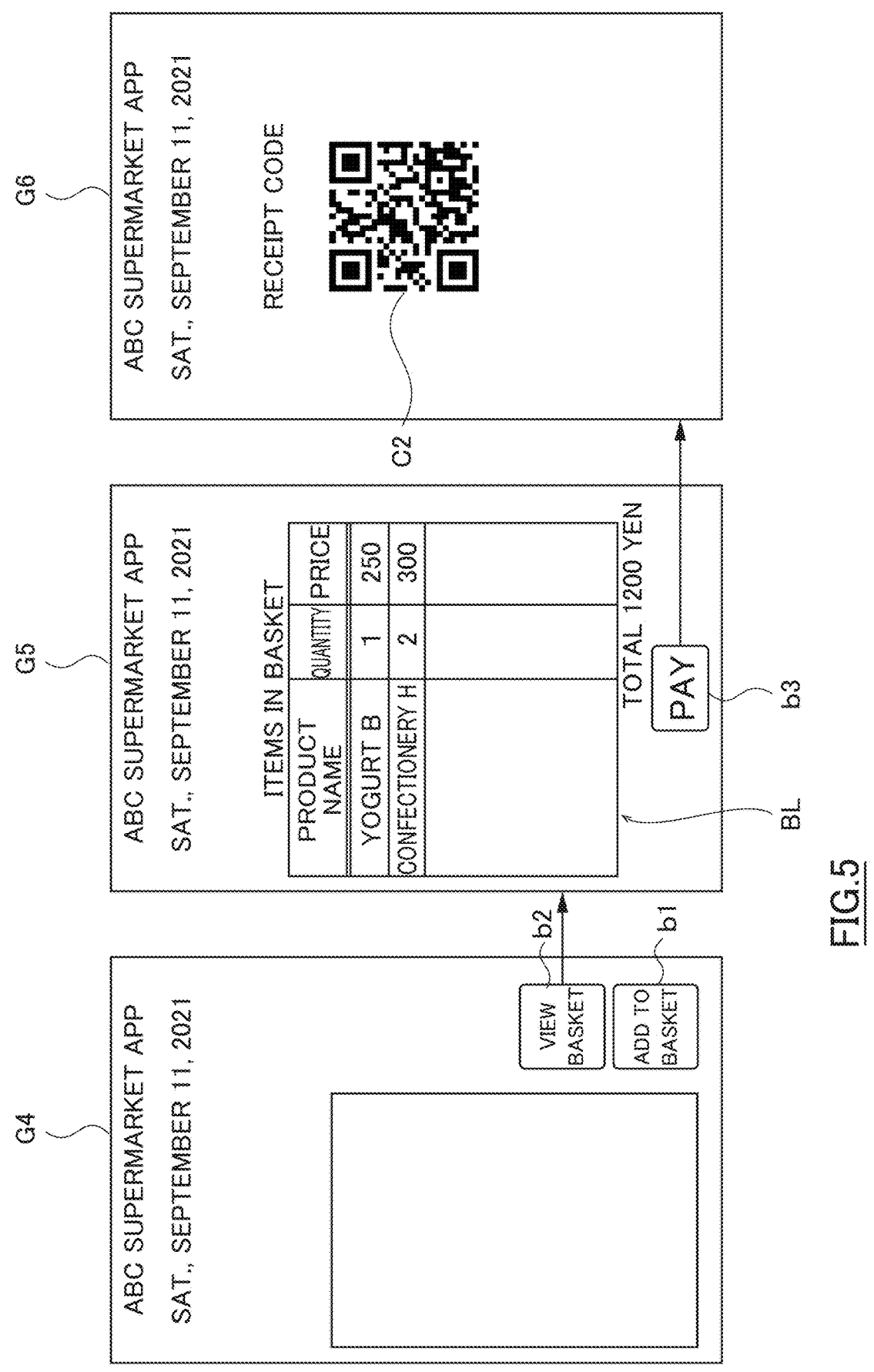
FIG. 5 shows an example of screen transition of the store application of the user terminal.
Figure 6:
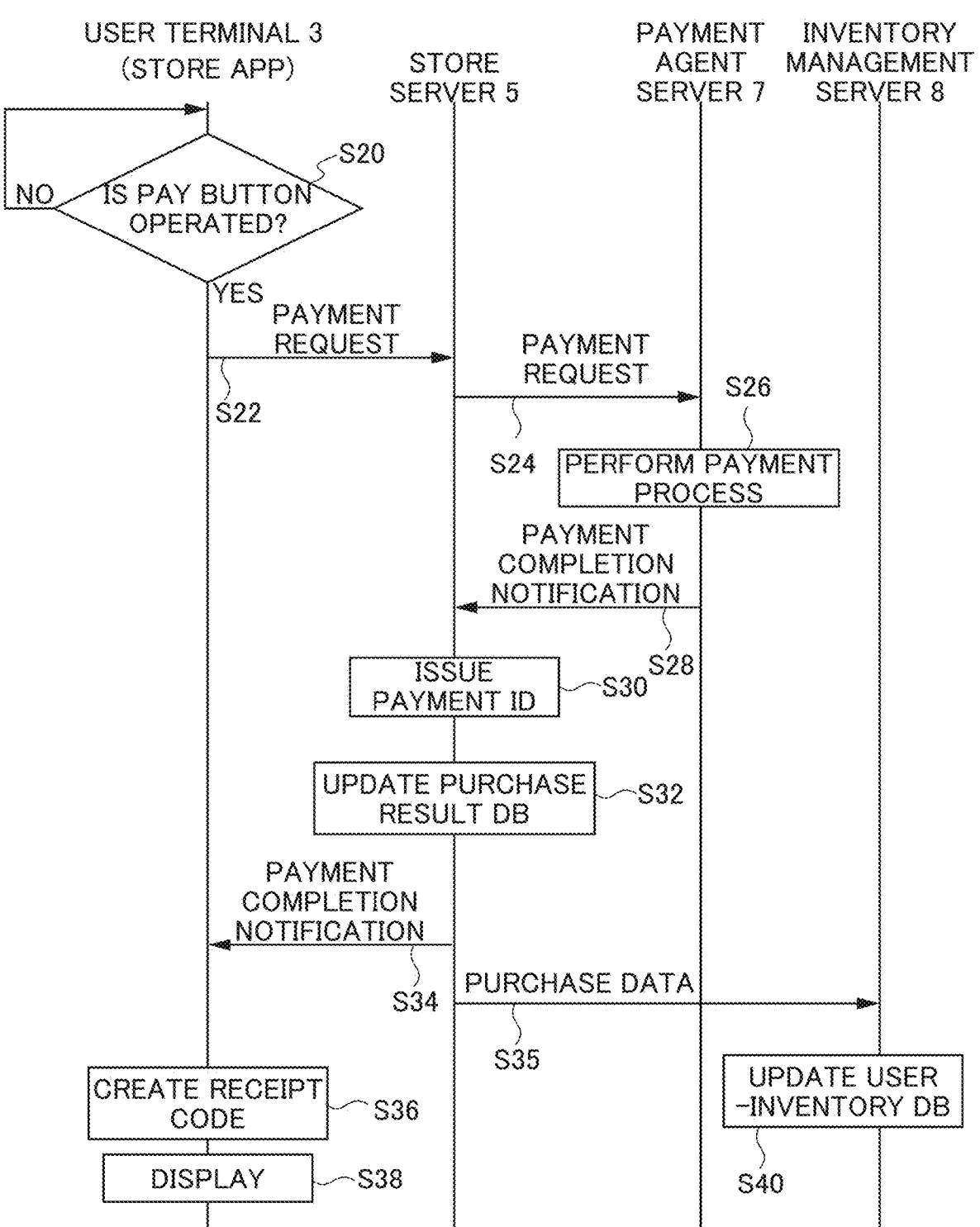
FIG. 6 is a sequence chart showing operation of the product inventory management system of an embodiment.

Next, a method of using the store application in making a payment for a product by the store application of the user terminal 3 will be described with reference to FIGS. 5 and 6. FIG. 5 shows an example of screen transition of the store application of the user terminal 3. FIG. 6 is a sequence chart showing processing of the store application of the user terminal 3.

After the user checks an offered price of a product and adds the product to the purchase list (that is, after the user repeatedly shows the screens G1 to G3 in FIG. 3), the user can make a payment by operating a button b2 ("VIEW BASKET") in a screen G4 to show a screen G5 that contains a purchase list BL. The purchase list BL contains a list of products that have been added (product name, quantity, and price of each product) and the total of prices.

Although not shown in the drawing, in order to cancel a certain product from the purchase list BL due to, for example, exceeding the budget, the user can operate to delete the product from the purchase list BL. In this case, the user returns the canceled product from the basket or shopping cart of the store to the shelf of the store.

In the state in which the purchase list BL is confirmed in the screen G5, the user operates a button b3 (payment button) (step S20 in FIG. 6). In response to this, the store application transmits a payment request including the purchase list, to the store server 5 (step S22).

Upon receiving the payment request from the store application, the store server 5 reads data of a user name and a payment method from the user database and transmits a payment request that includes the read data of the user name and the payment method and data of a payment amount (total of prices in the purchase list), to the payment agent server 7 (step S24). The payment agent server 7 performs a payment process based on the data provided from the store server 5 (step S26). After completing the payment process, the payment agent server 7 transmits a payment completion notification to the store server 5 (step S28).

After the payment is completed, the store server 5 issues a new payment ID (step S30) and creates a new record in a purchase result database (described below) to update the purchase result database (step S32).

FIG. 7 shows an example of components of the purchase result database.

Each record of the purchase result database illustrated in FIG. 7 includes a value of each of these fields: "USER ID," "PAYMENT ID," "PAYMENT ISSUE DATE," and "PURCHASE CONTENTS." Herein, the value in the "PAYMENT ID" field is data that is uniquely assigned to each payment of a corresponding user. The value in the "PAYMENT ISSUE DATE" field shows date and time when a payment that is identified by a payment ID is issued.

The "PURCHASE CONTENTS" field includes subfields: "PRODUCT ID," "PRODUCT NAME," "PRICE," "NUMBER OF PIECES/QUANTITY," and "BEST-BY DATE." The value of each subfield shows data of details of purchase contents of a payment identified by a payment ID.

With reference again to FIG. 6, the store server 5 transmits a payment completion notification corresponding to the payment request in step S22, to the store application (step S34). This payment completion notification includes the payment ID that is issued in step S30. The store application creates a receipt code that is a two-dimensional code containing the payment ID, which is included in the received payment completion notification (step S36). Then, the store application displays the receipt code on the user terminal 3 (step S38). In one example, a screen G6 containing code information C2 as a receipt code appears, as shown in FIG. 5. The receipt code represents that the payment for products has been completed and contains a payment ID (described later) for identifying the payment transaction. Although a two-dimensional code is shown herein as an example of the receipt code, a bar code or the like may be used.

The receipt code shown in the screen G6 is used, for example, to notify the store or a store staff of the completion of payment for products in the basket.

For example, the store may be configured to allow the user to leave the store after the user shows the receipt code to a store staff, or a gate may be opened to allow the user to leave the store, by making a predetermined device in the store read the receipt code. Such a procedure is useful for both of the user and the store because the user does not need to line up at a checkout counter, and a checkout staff of the store does not need to receive a payment for products.

After updating the purchase result database, the store server 5 transmits purchase data to the inventory management server 8 (step S35). The purchase data is data indicating updated contents in the purchase result database in step S32 and contains information on the products that the user completes the payment. The inventory management server 8 receives the purchase data and then updates a user inventory database (described below) based on the purchase data (step S40).

FIG. 8 shows an example of components of the user inventory database.

The user inventory database is stored in the inventory management server 8 and is managed per user ID. Each record of the user inventory database includes a value of each of these fields: for example, "PRODUCT ID," "PRODUCT NAME," "NUMBER OF PIECES/QUANTITY," and "BEST-BY DATE." The value of each field is data of the same type as the value of a corresponding field included in the purchase result database. With respect to a certain user, the data that is added to the purchase result database at the time of purchase of a product, is reflected also in the user inventory database.

The following describes data per user ID in the user inventory database, as "inventory data."

Next, a method of using the inventory management application will be described with reference to FIGS. 9 and 10.

Figure 9:
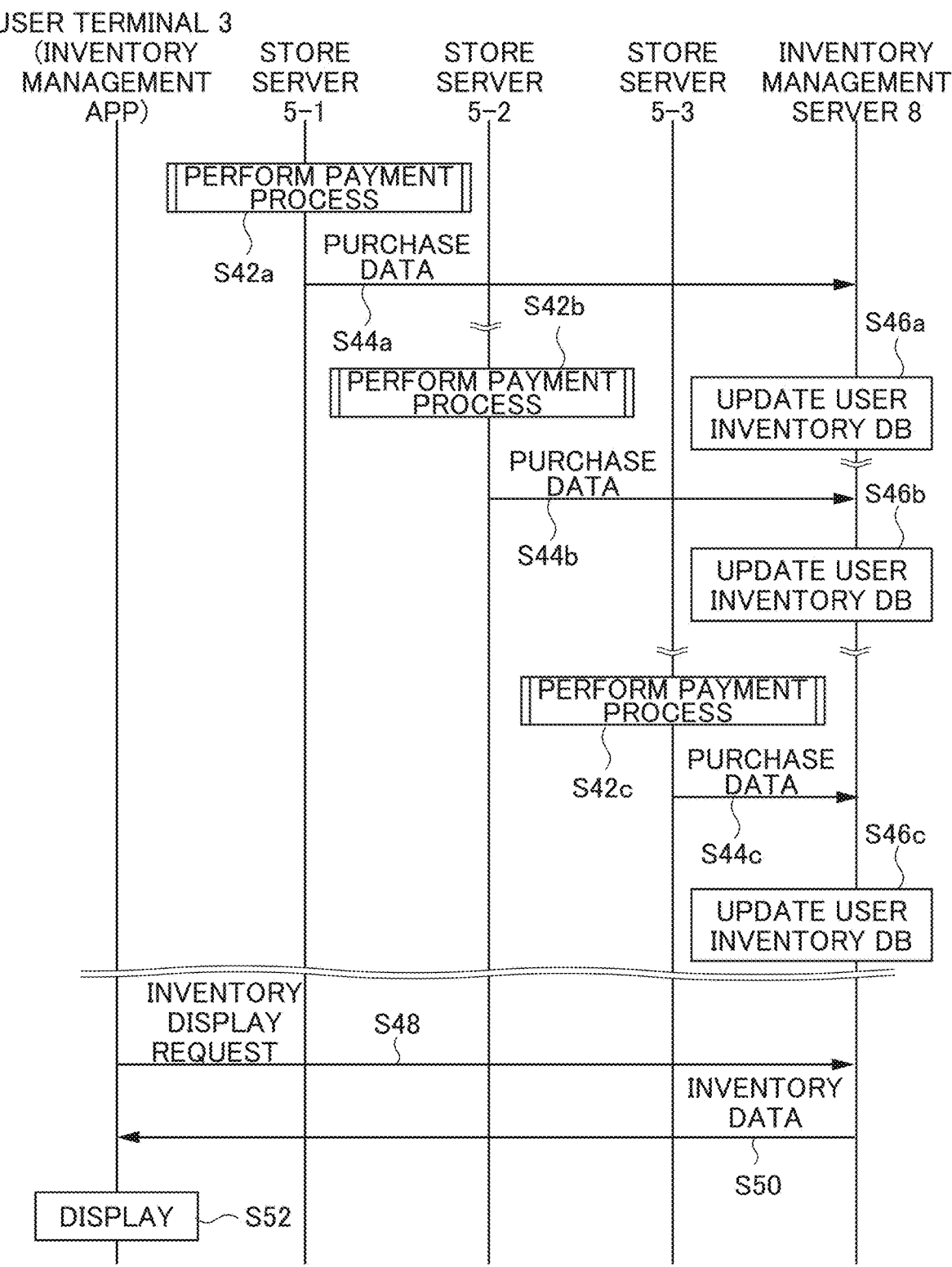
FIG. 9 is a sequence chart showing operation of the product inventory management system of an embodiment.

FIG. 9 is a sequence chart showing processing for displaying an inventory of products at home of a user by using the inventory management application of the user terminal 3. FIG. 10 shows an example of a screen displayed by the inventory management application.

With reference to FIG. 9, each of the store servers 5-1, 5-2, and 5-3 transmits purchase data to the inventory management server 8 (steps S44*a*, S44*b*, and S44*c*) each time the payment process is performed (steps S42*a*, S42*b*, and S42*c*). The payment process in steps S42*a*, S42*b*, and S42*c* involves the series of processes in steps S20 to S32 in FIG. 6. The inventory management server 8 updates the user inventory database by using the purchase data each time it receives the purchase data from the store servers 5-1, 5-2, and 5-3 (steps S46*a*, S46*b*, and S46*c*). Thus, the user inventory database of the inventory management server 8 centrally manages products that the same user has paid for in the plurality of store servers 5.

The purchase data that is received by the inventory management server 8 contains a user ID and information on products that the user completes the payment, which are included in the purchase result database. The user inventory database is updated by using this purchase data, and therefore, a user ID of the store user database and a user ID of an inventory app user database are associated with each other in advance, or they can be associated with each other based on a user name or the like, as described later.

The inventory management application transmits an inventory display request based on, for example, a predetermined operation by a user (step S48). Upon receiving the inventory display request, the inventory management server 8 reads inventory data corresponding to the source user ID and returns it to the inventory management application (step S50). The inventory management application displays the received inventory data (step S52).

A screen G7 in FIG. 10 is an example of a screen displayed in step S52. The screen G7 contains an inventory list IL composed of pieces of information, which are a product ID, a product name, the number of pieces/quantity, and a best-by date, of each product.

Next, a configuration of each device of the product inventory management system 1 of this embodiment will be described with reference to the functional block diagram in FIG. 11.

Figure 11:
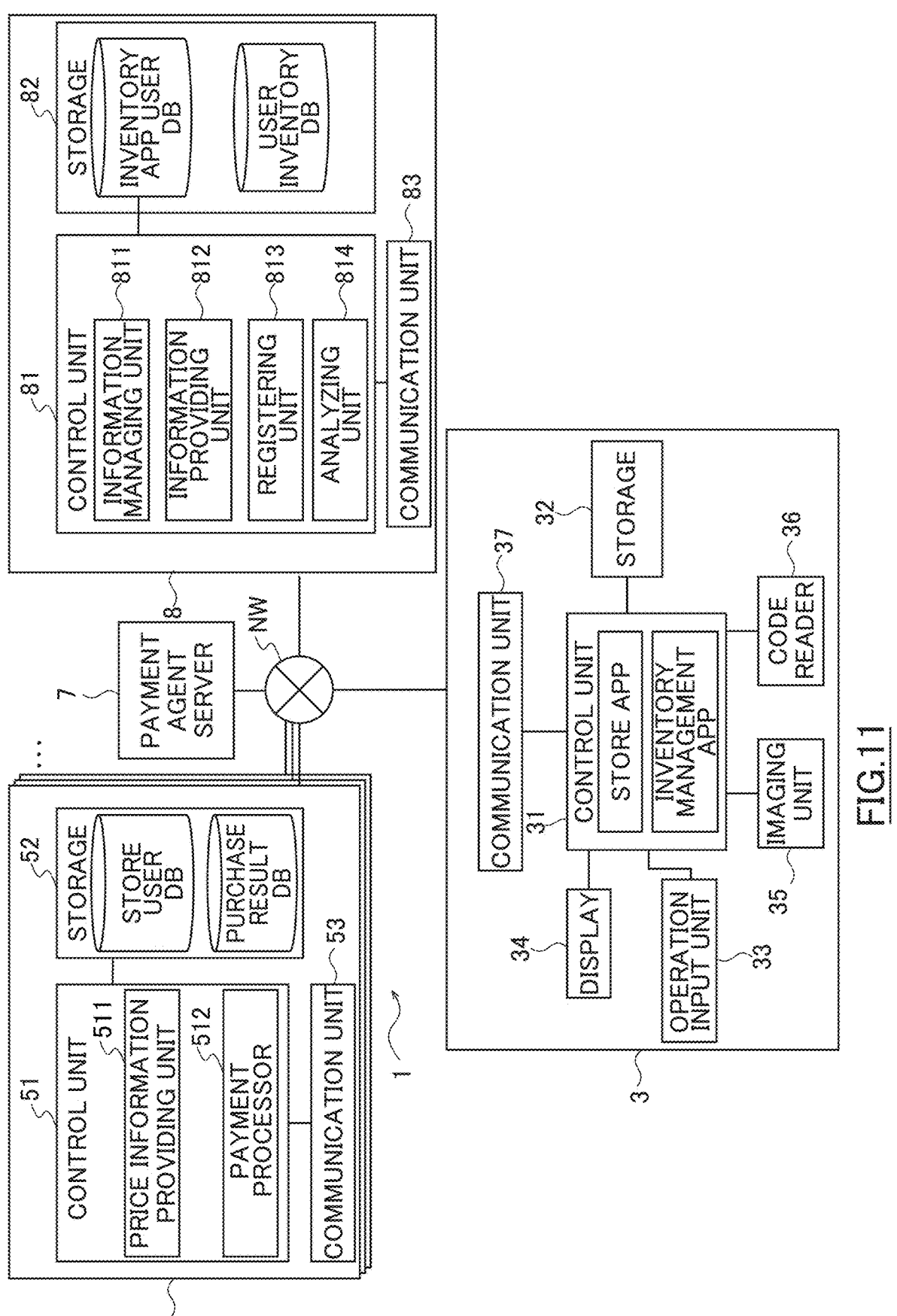
FIG. 11 is a block diagram showing an internal configuration of each device of the product inventory management system of an embodiment.

As shown in FIG. 11, the user terminal 3 includes a control unit 31, a storage 32, an operation input unit 33, a display 34, an imaging unit 35, a code reader 36, and a communication unit 37.

The control unit 31 is composed mainly of a microprocessor and controls the user terminal 3 wholly. In one example, the microprocessor that is contained in the control unit 31 loads and executes programs of the store application and the inventory management application recorded in the storage 32 and displays the results of execution on the display 34.

The storage 32 is a non-volatile memory and may be a solid state drive (SSD), such as a flash memory. The storage 32 stores, in addition to the programs of the store application and the inventory management application, data and files that are created by executing the store application and the inventory management application, and so on.

The control unit 31 executes the store application to implement the following functions:

(1-i) acquire product information, best-by date information, etc., of a product from code information shown on the product;

(1-ii) transmit a price inquiry about information on an offered price of a product for a user, to the store server 5 (that is, request information on an offered price of a product);

(1-iii) receive (acquire) information on an offered price of a product from the store server 5 and cause the display 34 to show the acquired information on the offered price of the product; and (1-iv) request the store server 5 to settle payment for each product contained in the purchase list.

The control unit 31 executes the inventory management application to implement the following functions:

(2-i) operate as a first acquisition unit that acquires a product ID (an example of product information) and best-by-date information (an example of expiration information on an expiration date of a product) from code information C1 attached on a product, via the code reader 36; and (2-ii) operate as a display control unit that acquires inventory data of a user from the inventory management server 8 and cause the display 34 to show product inventory information.

The operation input unit 33 is, for example, a touch panel input device that is provided to a display panel of the user terminal 3.

The display 34 has, for example, a liquid crystal display panel or an organic EL panel, and it displays results of execution of the store application and the inventory management application. The display 34 also displays a digital image signal that is generated by the imaging unit 35.

The imaging unit 35 has, for example, an optical lens and an imaging device (image sensor) that converts incident light from the optical lens into an electric signal, and it successively generates a digital image and outputs the digital image to the display 34.

The code reader 36 analyzes code information, which is contained in the image signal generated by the imaging unit 35, and it then extracts (obtains) data (that is, product information, such as a product ID, and best-by date information) from the code information.

The communication unit 37 is a communication interface for communicating with the store server 5 and the inventory management server 8. The communication protocol is not limited, but for example, it may be HTTP or HTTPS.

As shown in FIG. 11, the store server 5 includes a control unit 51, a storage 52, and a communication unit 53.

The control unit 51 is composed mainly of a microprocessor and controls the store server 5 wholly. In one example, the microprocessor that is contained in the control unit 51 loads and executes a server program recorded in the storage 52.

The storage 52 is a mass storage device, such as a hard disk drive (HDD), and it stores the store user database (store user DB; refer to FIG. 2) and the purchase result database (purchase result DB; refer to FIG. 7), in addition to the server program. The store user database and the purchase result database are accessed by the control unit 51, as appropriate, when the control unit 51 executes the server program.

Although not shown in the drawing, the storage 52 stores data of an offered price of each product sold in a store. The data of offered prices is referred to by the control unit 51 that receives a price inquiry from the store application of a user.

The communication unit 53 is a communication interface for communicating with the user terminal 3, the payment agent server 7, and the inventory management server 8.

The control unit 51 executes the server program to implement functions of a price information providing unit 511 and a payment processor 512.

The price information providing unit 511 provides information that contains an offered price of an inquired product, to the store application of the user terminal 3. In one example, the information that is contained in the screens G2 and G3 in FIG. 3 is provided by the price information providing unit 511.

The payment processor 512 performs the payment process of a product contained in the purchase list, in conjunction with the payment agent server 7, in response to instruction operated to the payment button (that is, a payment request) obtained from the user terminal 3. The payment processor 512 reads data of a user name and a payment method from the store user database and provides the data to the payment agent server 7. In addition, the payment processor 512 creates a new record in the purchase result database upon receiving a payment request from the store application.

As shown in FIG. 11, the inventory management server 8 includes a control unit 81, a storage 82, and a communication unit 83.

The control unit 81 is composed mainly of a microprocessor and controls the inventory management server 8 wholly. In one example, the microprocessor that is contained in the communication unit 81 loads and executes a server program recorded in the storage 82.

The storage 82 is a mass storage device, such as an HDD, and it stores an inventory app user database (inventory app user DB; described below) and the user inventory database (user inventory DB; refer to FIG. 8), in addition to the server program. The store app user database and the user inventory database are accessed by the control unit 81, as appropriate, when the control unit 81 executes the server program.

The communication unit 83 is a communication interface for communicating with the user terminal 3 and the store server 5.

FIG. 12 shows an example of components of the inventory app user database.

Each record of the inventory app user database illustrated in FIG. 12 includes a value of each of these fields: "USER ID," "USER NAME," "GROUP ID," and "VIEW PERMISSION."

The user ID is different from the user ID of the store user database stored in the store server 5 and is assigned by the inventory management application.

As shown in FIG. 6, the inventory management server 8 receives purchase data associated with a user ID of the store user database, from the store application, and it then updates the inventory data of a certain user ID in the user inventory database. Here, the user ID of the store user database and the user ID of the inventory app user database are associated with each other in advance, or they can be associated with each other based on a user name or the like.

The group ID is an ID that is assigned to a plurality of users in a shared manner. In a typical example, a single group ID that is shared among a plurality of users sharing the living expenses, such as family members, is assigned in response to an application from a user.

The view permission means to permit a certain user to view the inventory data of another user. The value of the "VIEW PERMISSION" field in the inventory app user database is one or both of a user ID of a user and a group ID of a group who gives a view permission to a user having a target user ID. In the example shown in FIG. 12, a user of a user ID Z001 is permitted to view the inventory data of a group of a group ID G008.

The group ID and the view permission will be further described in relation to embodiments described later.

With reference again to FIG. 11, in the inventory management server 8, the microprocessor executes the server program to cause the control unit 81 to function as an information managing unit 811, an information providing unit 812, a registering unit 813, and an analyzing unit 814.

The information managing unit 811 (an example of a second acquisition unit) acquires a product ID and best-by-date information that are obtained by the user terminal 3, as inventory data (an example of product inventory information) of a user when the user has paid for the product. As shown by step S35 in FIG. 6, the information managing unit 811 acquires purchase data containing a product ID and best-by-date information obtained by the user terminal 3, via the store server 5, after a product is paid for.

The information providing unit 812 provides the inventory data of a user acquired by the information managing unit 811, to the inventory management application of the user terminal 3, based on an inventory display request from the user, as shown by step S50 in FIG. 9.

The registering unit 813 registers one or a plurality of users as one group.

The analyzing unit 814 analyzes consumption status of a user or a group, based on the inventory data.

The registering unit 813 and the analyzing unit 814 will be described later.

As described above, in the product inventory management system 1 of this embodiment, the user terminal 3 obtains a product ID and best-by-date information on a product in a store and transmits them to the store server 5 for the purpose of making a payment. The inventory management server 8 acquires the product ID and the best-by-date information, which are obtained by the user terminal 3, as inventory data of a user from the store server 5 when the user has paid for the product. The inventory management server 8 provides the inventory data corresponding to the user ID to the user terminal 3, based on an inventory display request from the inventory management application of the user. The user terminal 3 then causes the display 34 to show the acquired inventory data of the user.

In the product inventory management system 1, a product ID and best-by-date information, which are obtained in a store by a user who reads them with use of the user terminal 3, are transferred from the store server 5 to the inventory management server 8 after the product is paid for. Thus, the user does not need to manually input the product ID and the best-by-date information on the purchased product to the inventory management application, whereby it is possible to efficiently manage the inventory based on the best-by-date information.

A case of obtaining a product ID and best-by-date information from a product in order for a user to make a payment without using a cash register in a store has been described above; however, they may be obtained in another situation. A product ID and best-by-date information may be obtained by the user terminal 3 in the case in which a user makes a payment at an ordinary checkout counter.

In the product inventory management system 1, purchase data containing a user ID is transmitted from the store servers 5-1, 5-2, 5-3, and . . . , corresponding to a plurality of stores, to the inventory management server 8, and this data is centrally managed as the inventory data of the user, in the user inventory database. This enables the user to check the inventory of a product that the user has purchased in each store, at the user's home by viewing one inventory data. That is, this system uses inventory information that is not dedicated to a certain store, which is convenient for a user to manage inventory of products in using a plurality of stores.

(2) Second Embodiment

Next, the product inventory management system of a second embodiment will be described with reference to FIGS. 13 to 15.

In this embodiment, when a user consumes a food (product) in the user's home, the user inventory database is updated based on operation performed by the user himself or herself.

Figure 13:
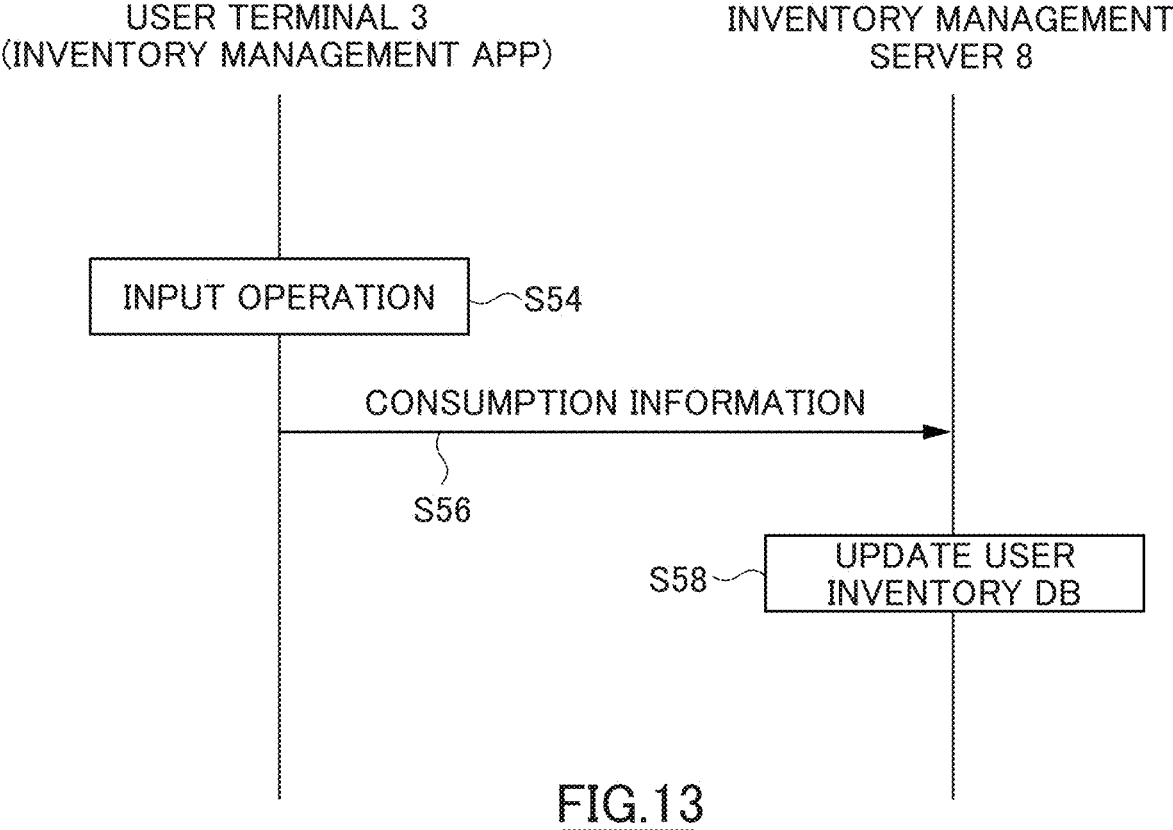
FIG. 13 is a sequence chart showing operation of the product inventory management system of an embodiment.

For example, with reference to a sequence chart in FIG. 13, in response to a predetermined operation input by a user (step S54), the inventory management application of the user terminal 3 obtains consumption information and transmits it to the inventory management server 8 (step S56). The inventory management server 8 updates the user inventory database based on the received consumption information (step S58).

Herein, the consumption information includes a product ID, an amount of a product consumed, and an amount (number of pieces or weight) of the remaining product.

Although not shown in the drawing, the consumption information from the inventory management application of the user terminal 3 can be obtained as follows. For example, a user selects a product that is contained in the inventory data, on the inventory management application, and the user then inputs an amount of the selected product consumed. A product may be selected by operating to select the product in a list of products based on the inventory data, or for a product attached with code information, such as a bar code, the product may be selected by reading the code information.

The method of obtaining the consumption information is not limited thereto, and various embodiments are possible. Other exemplary methods of obtaining the consumption information are illustrated in FIGS. 14A, 14B, and 15.

Figure 14A:
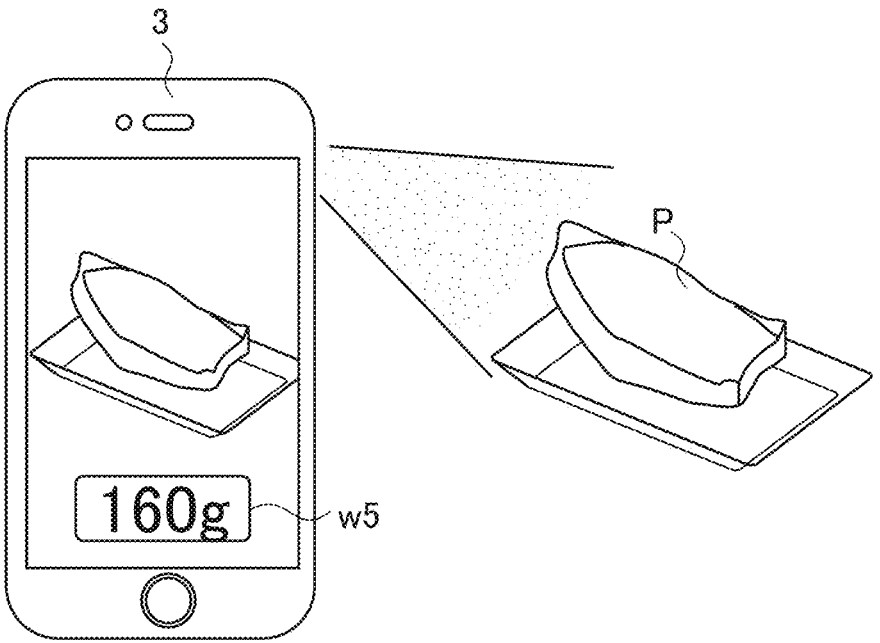
FIG. 14A shows an example of a method of obtaining information on consumption by a user.

In the example shown in FIG. 14A, the inventory management application obtains an image of a product "P" in conjunction with the imaging function of the user terminal 3, and it obtains product information on the product "P" and also obtains consumption information by estimating the weight of the product "P," based on the obtained image. The weight of the product "P" can be estimated also by using AI technology. The product "P" and the weight of the product "P," which are estimated, may be displayed as shown by a window w5.

Figure 14B:
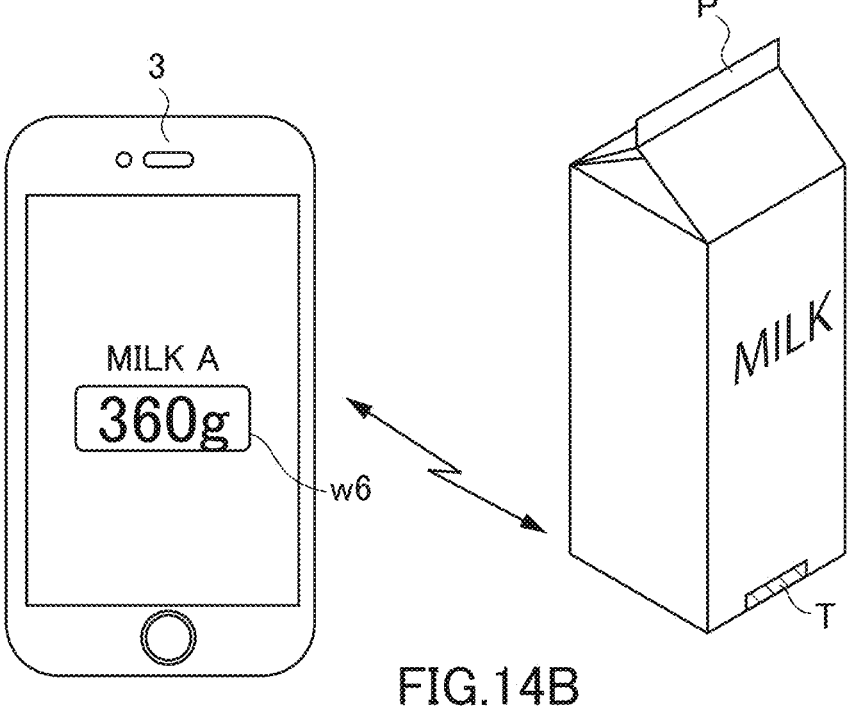
FIG. 14B shows an example of the method of obtaining information on consumption by a user.

In the example shown in FIG. 14B, a radio tag "T" having a weight sensor (an example of a communication device) is embedded in the vicinity of a bottom surface of a product "P." In this example, the inventory management application receives product information on the product "P" and data of weight of the product "P," to obtain consumption information, by wireless communication with the radio tag "T." The received data of weight may be displayed as shown by a window w6. The type of the radio tag "T" is not limited; but for example, it is preferably an energy harvesting tag that converts radio waves of a plurality of different frequency bands over a wide range, into energy.

In an embodiment, the radio tag "T" operates by obtaining energy from radio waves of one or a plurality of certain frequencies present in the surroundings. The certain frequencies include any frequencies of radio waves that can be converted into energy by the radio tag "T." The certain frequencies may be of one or a plurality of frequency bands or may include a specific frequency that is assigned within a frequency band.

In an embodiment, the certain frequency may be a specific frequency or of a specific frequency band that is standardized, for example, in a wireless communication standard, and it is a specific frequency or of a specific frequency band that is designated by a company that provides the inventory management application of this embodiment.

Non-limiting examples of radio waves that can be used in energy harvesting include radio waves for wireless communication in frequency bands employed in mobile communication systems such as 3G to 5G systems, radio waves for wireless communication in frequency bands employed in communication standards such as Bluetooth (registered trademark) and Wi-Fi (registered trademark), radio waves for wireless communication in 2.4 GHz band, represented by communication protocols such as ZigBee (registered trademark) and Thread, radio waves for wireless communication in frequency bands employed in RFID (e.g., 900 MHz band and 13.56 MHz band).

In addition, in an embodiment, the inventory management application may read bar code information or textual information described on a package or the like of the product "P" shown in FIG. 14B, in conjunction with the imaging function of the user terminal 3. Then, the inventory management application may obtain product information on the product "P" and consumption information by estimating the weight of the product "P," based on the obtained image. The product "P" and the weight of the product "P," which are estimated, may be displayed.

Figure 15:
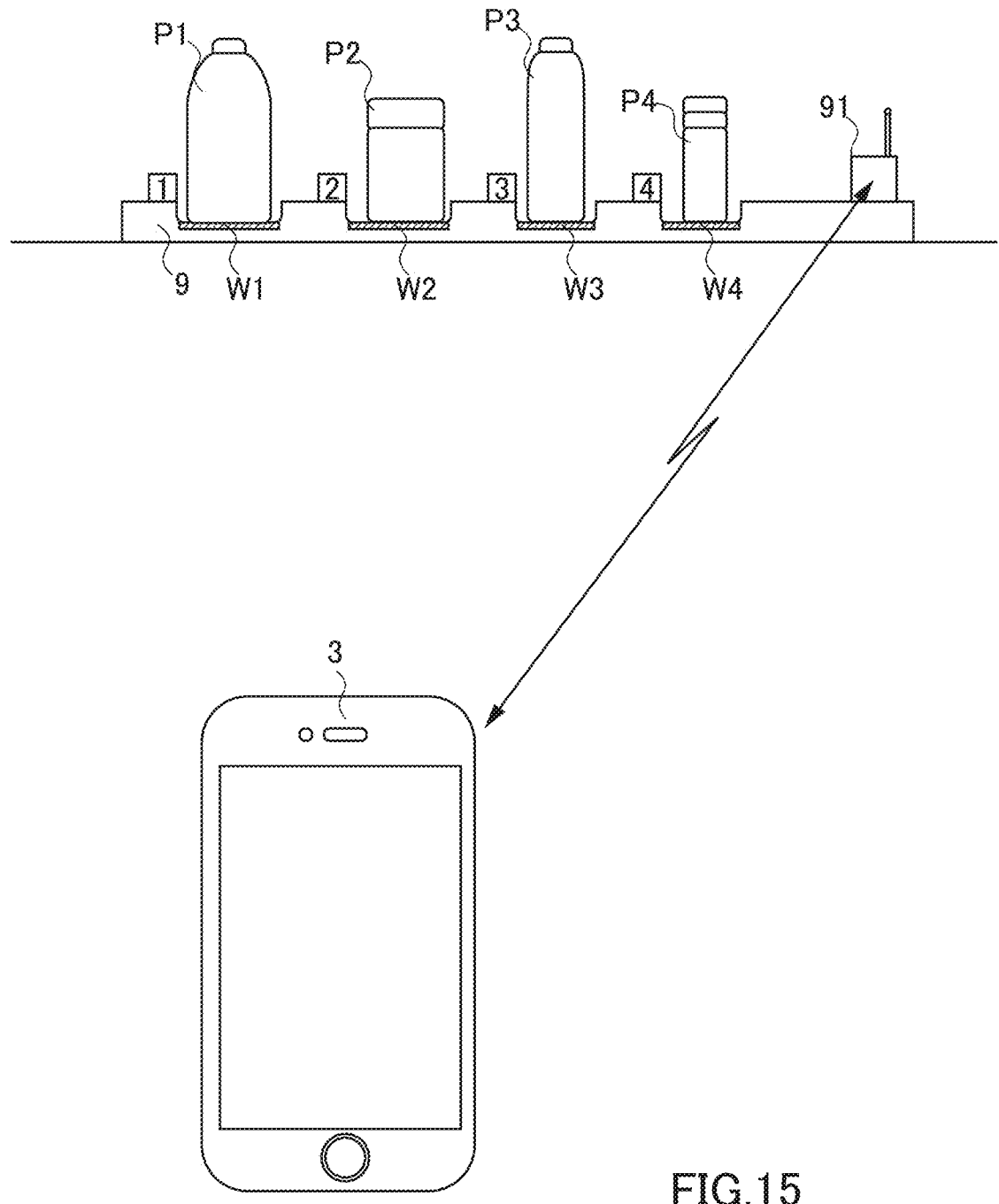
FIG. 15 shows an example of the method of obtaining information on consumption by a user.

The example shown in FIG. 15 assumes that products P1 to P4 are seasonings, such as soy sauce, pepper, and salt. The products P1 to P4 are respectively placed in the first to the fourth slots of a sheet-type weight sensor 9. The slots are provided with weight sensors W1 to W4. The sheet-type weight sensor 9 has an antenna 91 that transmits data of weight from each slot to the inventory management application of the user terminal 3.

Products that are placed in the first to the fourth slots of the sheet-type weight sensor 9 can be registered in the inventory management application. In the configuration example shown in FIG. 15, the inventory management application sequentially acquires consumption information on the products P1 to P4 from the antenna 91.

Although not shown in the drawing, in a case in which products are put in a refrigerator in a user's home, a radio tag "T" having a weight sensor may be attached to each product in the refrigerator. In this case, the user terminal 3 of the user receives a product ID and data of weight from the radio tag "T" of each product in the refrigerator each time the user opens the refrigerator. In response to this, the inventory management application of the user terminal 3 collectively acquires pieces of consumption information on the products in the refrigerator. The inventory management application of the user terminal 3 transmits the acquired consumption information to the inventory management server 8. The inventory management server 8 updates the user inventory database based on the received consumption information.

In the case in which detection of the radio tag "T" is failed, it is presumed that the product attached with the radio tag "T" is discarded, and thus, the product may be deleted from the user inventory database.

In the case of using an RFID tag having a weight sensor as the radio tag "T," an RFID reader is set up on the refrigerator, and consumption information may be acquired via the reader.

In this embodiment, the control unit 31 of the user terminal 3 functions as an acquisition unit (an example of a third acquisition unit) that acquires consumption information on a consumption amount of each product contained in the inventory data.

The control unit 81 of the inventory management server 8 functions as an updating unit that updates the inventory data of a corresponding user in the user inventory database, based on consumption information acquired from the inventory management application of the user terminal 3.

The product inventory management system of this embodiment updates the user inventory database, which is stored in the inventory management server 8, in response to operation of a user, whereby the inventory data that reflects daily consumption states can be visualized on the inventory management application. Specifically, a best-by date and a remaining amount of each product can be shown on the inventory management application, which enables a user to efficiently consume products or plan using products.

(3) Third Embodiment

Next, the product inventory management system of a third embodiment will be described with reference to FIGS. 16 to 18.

In the product inventory management system of this embodiment, a user can view the inventory data of a group the user himself or herself belongs to, other users, and other groups.

In one example, each of a plurality of users who are family members living in the same home, may be allowed to view the inventory data of the whole family. This makes it possible to visualize the inventory data, for example, among users who share the living expenses. In this example, it is possible to avoid situations of unnecessary purchase, such as duplicate purchase of the same product by family members, and forgetting to purchase.

Moreover, a user may be allowed to view the inventory data of another user or another group of a user, who does not live together with the user in the same home (e.g., an elderly parent or their family). This enables checking whether the family who lives apart from the user takes meals and spends time as usual.

Figure 16:
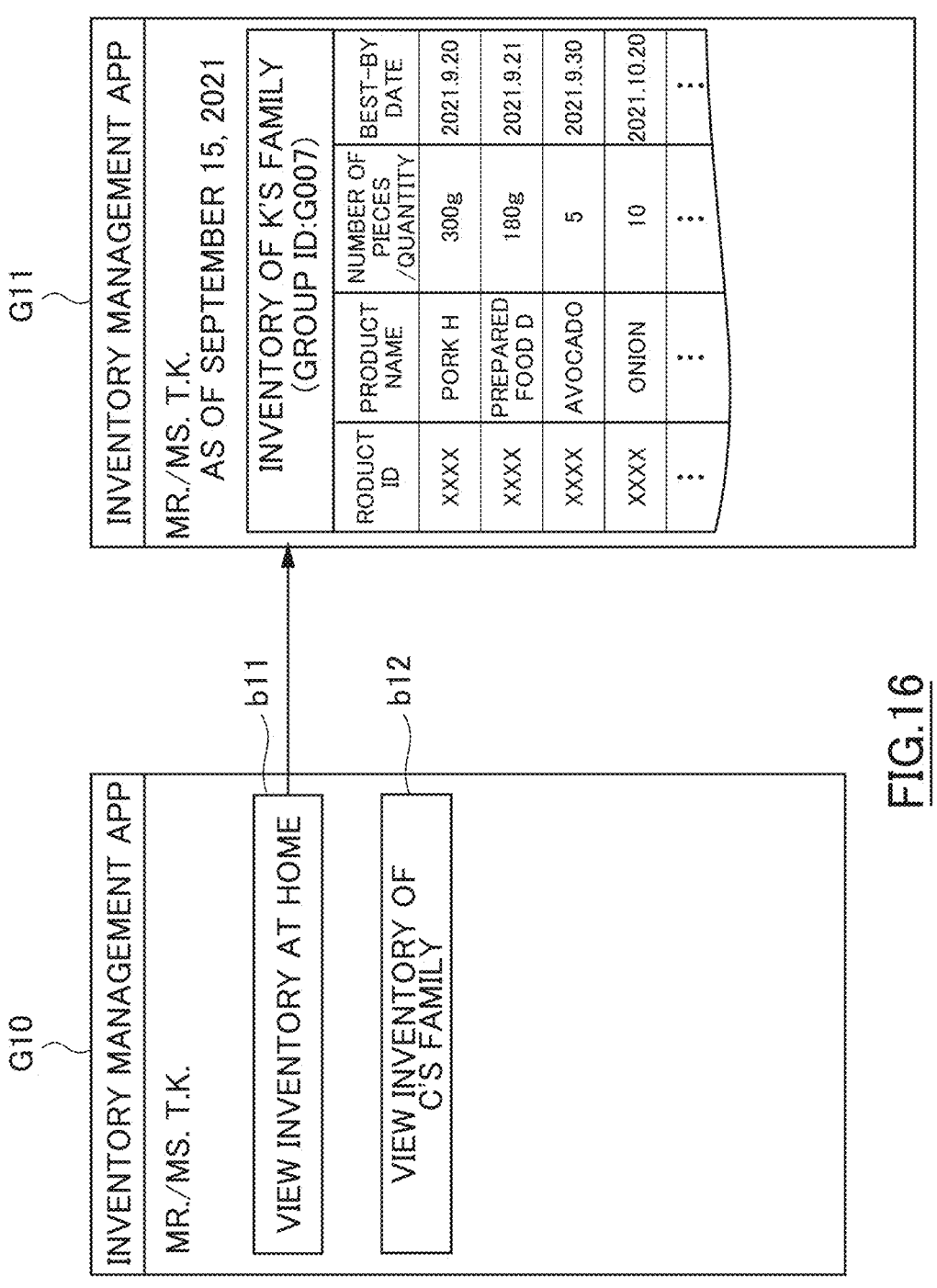
FIG. 16 shows an example of screen transition of the inventory management application of the user terminal.

FIG. 16 shows an example of screen transition of the inventory management application of the user terminal 3 in the product inventory management system of this embodiment. The example in FIG. 16 assumes that a user, T.K., is a member of a K's family and the user is allowed to view the inventory data of a C's family who is the user's parent not living together with the user.

In this case, a screen G10 of the inventory management application of the user, T.K., shows a button b11 for viewing the inventory at the user's home and a button b12 for viewing the inventory of the C's family, who lives apart from the user. In this state, in response to operation to the button b11, the inventory data of the K's family can be viewed as shown in a screen G11. This viewed data is generated by merging pieces of inventory data of a plurality of users who are preliminarily associated with the user, T.K., as family members living in the same home.

Figure 17:
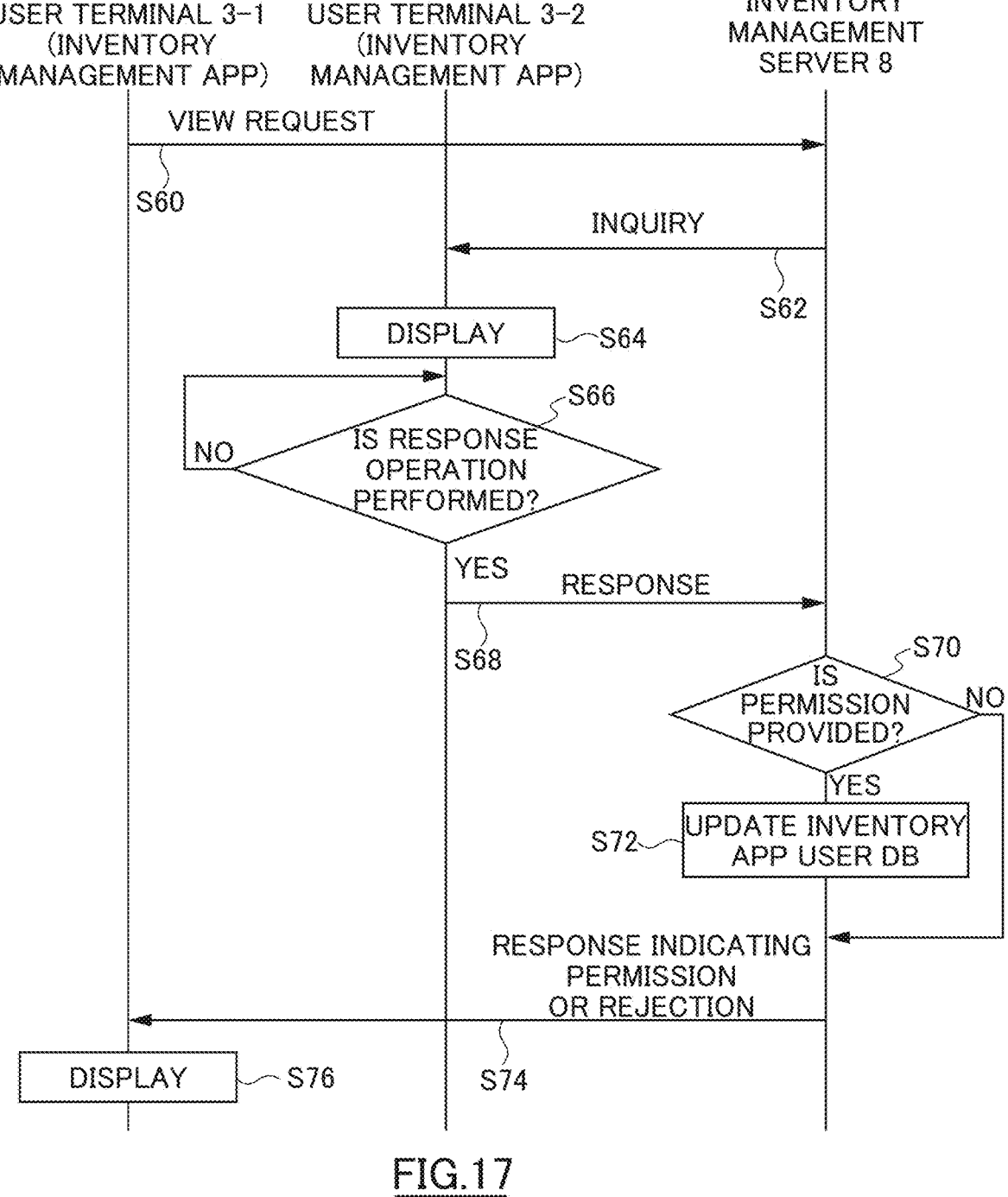
FIG. 17 is a sequence chart showing operation of the product inventory management system of an embodiment.

A sequence chart in FIG. 17 shows a flow in the case in which a certain user obtains permission to view the inventory data, from another user.

FIG. 17 assumes that a user who hopes to view the inventory data of another user, carries a user terminal 3-1, whereas the another user carries a user terminal 3-2.

First, on the basis of operation of the user, the inventory management application of the user terminal 3-1 transmits a view request to the inventory management server 8 (step S60). The view request includes a user ID of the another user or a group ID of another group having inventory data that the user hopes to view.

Upon receiving the view request, the inventory management server 8 inquires whether to permit viewing the inventory data, of the inventory management application of the user ID included in the view request or the user ID that is preliminarily registered as a representative of the group ID (step S62). This inquiry is shown on the inventory management application of the user terminal 3-2 (step S64).

When the user of the user terminal 3-2 performs a response operation on the inventory management application (step S66: YES), this response is returned to the inventory management server 8 (step S68). This response includes information on whether to permit viewing. In the case in which the response in step S68 indicates permission for viewing (step S70: YES), the inventory management server 8 updates the inventory app user database (refer to FIG. 12) by writing the user ID of the view request destination in the "VIEW PERMISSION" field thereof (step S72). In the case in which the response in step S68 indicates rejection for viewing (step S70: NO), the inventory app user database is not updated.

The inventory management server 8 returns a response indicating permission or rejection for viewing, to the inventory management application of the user terminal 3-1 of the view request source (step S74). Then, the content of this response indicating permission or rejection is shown on the display 34 of the user terminal 3-1 (step S76).

As shown by the inventory app user database in FIG. 12, when a user (viewer) of a certain user ID is permitted to view the inventory data corresponding to a user (view target) of another user ID, the another user ID is recorded in an associated manner. The view target is, for example, an elderly parent or a child who lives alone, of the viewer. In this case, the viewer can indirectly watch over whether the view target can live a life as usual, by viewing the inventory data of the view target.

The flow of grouping a plurality of users, such as family members, is omitted here, but it can be approximately the same as that of the sequence chart in FIG. 17. Alternatively, when family members start to use the inventory management application, a plurality of users of the family members may be grouped and be recorded in the inventory app user database. The plurality of user IDs of the same group are associated with the same group ID in the inventory app user database. In the state in which grouping is performed, the inventory data can be viewed by a unit of group. Thus, it is possible for family members to avoid situations such as duplicate purchase of the same product, resulting in efficiently managing the state of inventory of products in the same group.

Figure 18:
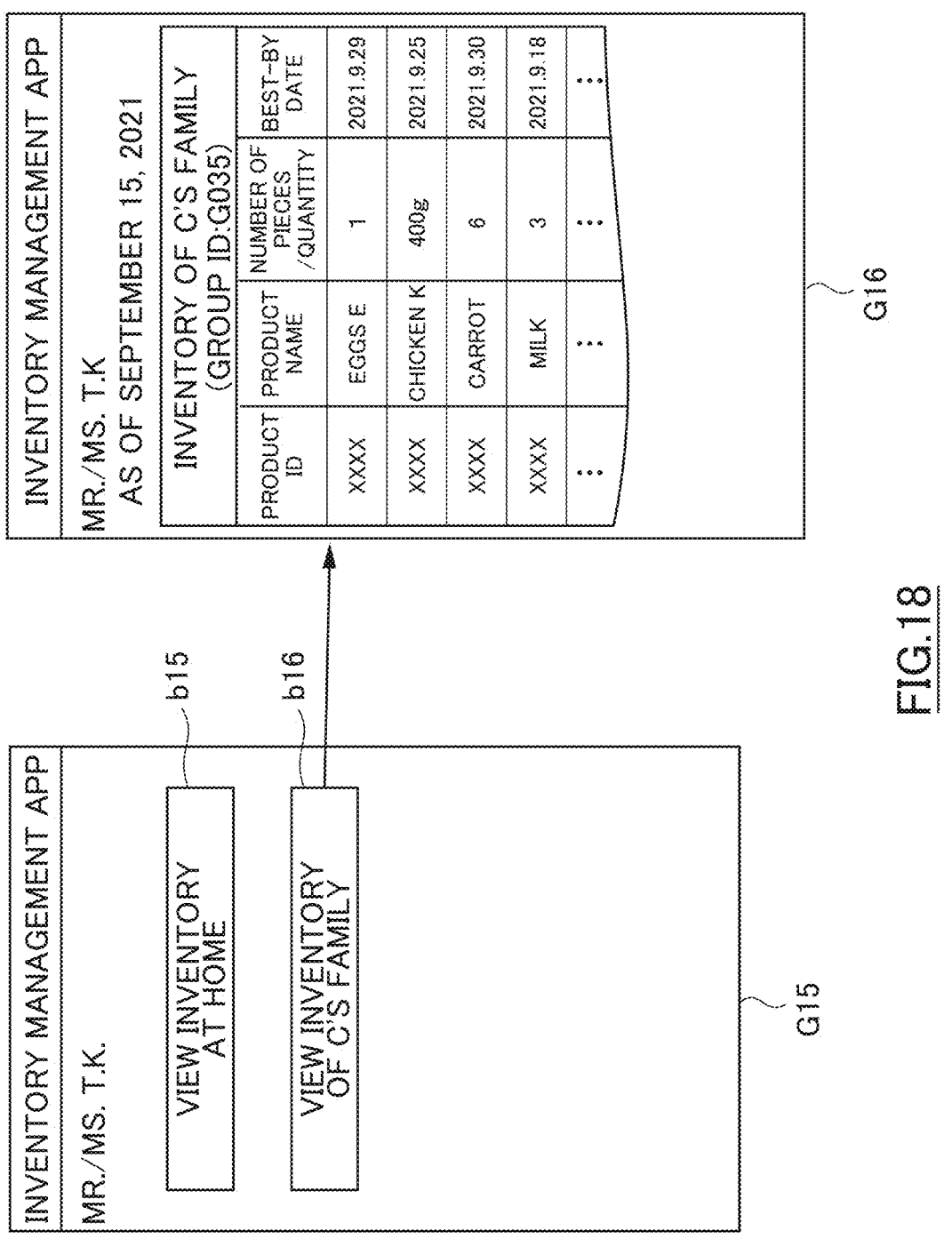
FIG. 18 shows an example of screen transition of the inventory management application of the user terminal.

FIG. 18 shows screen transition on the inventory management application when the user, T.K., who is permitted to view the inventory data of the C's family, views the inventory data of the C's family.

A screen G15 in FIG. 18 is the same as the screen G10 in FIG. 16. Here, in response to selective operation to the button b16, the screen is switched to a screen G16, and the inventory data of, for example, the C's family who lives apart from the user, can be viewed. Thus, it is possible to indirectly monitor the health condition of the family who lives apart from the user. In addition, what kind of foods the family who lives apart from the user, or another person, eats daily can also be known by periodic monitoring.

The inventory management server 8 of this embodiment performs the following operation in order to provide the inventory data of one group of family members who live in the same home, or other persons, to a user belonging to the group.

The registering unit 813 of the control unit 81 registers a product ID and inventory data that are obtained from each user of the group by the information providing unit 812, as the inventory data of the group. This process corresponds to writing a value in one of cells of the "GROUP ID" field in the inventory app user database so as to associate the user ID and the group ID with each other.

On the basis of a request from one of the users in the group, the information providing unit 812 provides the inventory data of the group, to the inventory management application of the user terminal 3 of the corresponding user.

The inventory management server 8 of this embodiment performs the following operation in order to provide a user with the inventory data of other users or other groups, such as a family who lives apart from the user.

The control unit 81 includes an associating unit that associates a plurality of groups that are registered by the registering unit 813, with each other. Herein, a group to be associated may be composed of only one user. The association is performed by writing a value in the "VIEW PERMISSION" field in the inventory app user database, as shown in FIG. 17.

In the state in which a first group and a second group are associated with each other by the associating unit, the information providing unit 812 provides the inventory data of the second group to the inventory management application of one of users of the first group.

(4) Fourth Embodiment

Next, the product inventory management system of a fourth embodiment will be described with reference to FIGS. 19, 20A, and 20B.

This embodiment is characterized in that the inventory management server 8 analyzes conditions of product consumption of a user. The user inventory database is updated each time a user purchases a product and each time the user consumes the product. It is possible to perform analysis related to health maintenance of a user by monitoring increase and decrease in the inventory data of the user.

Figure 19:
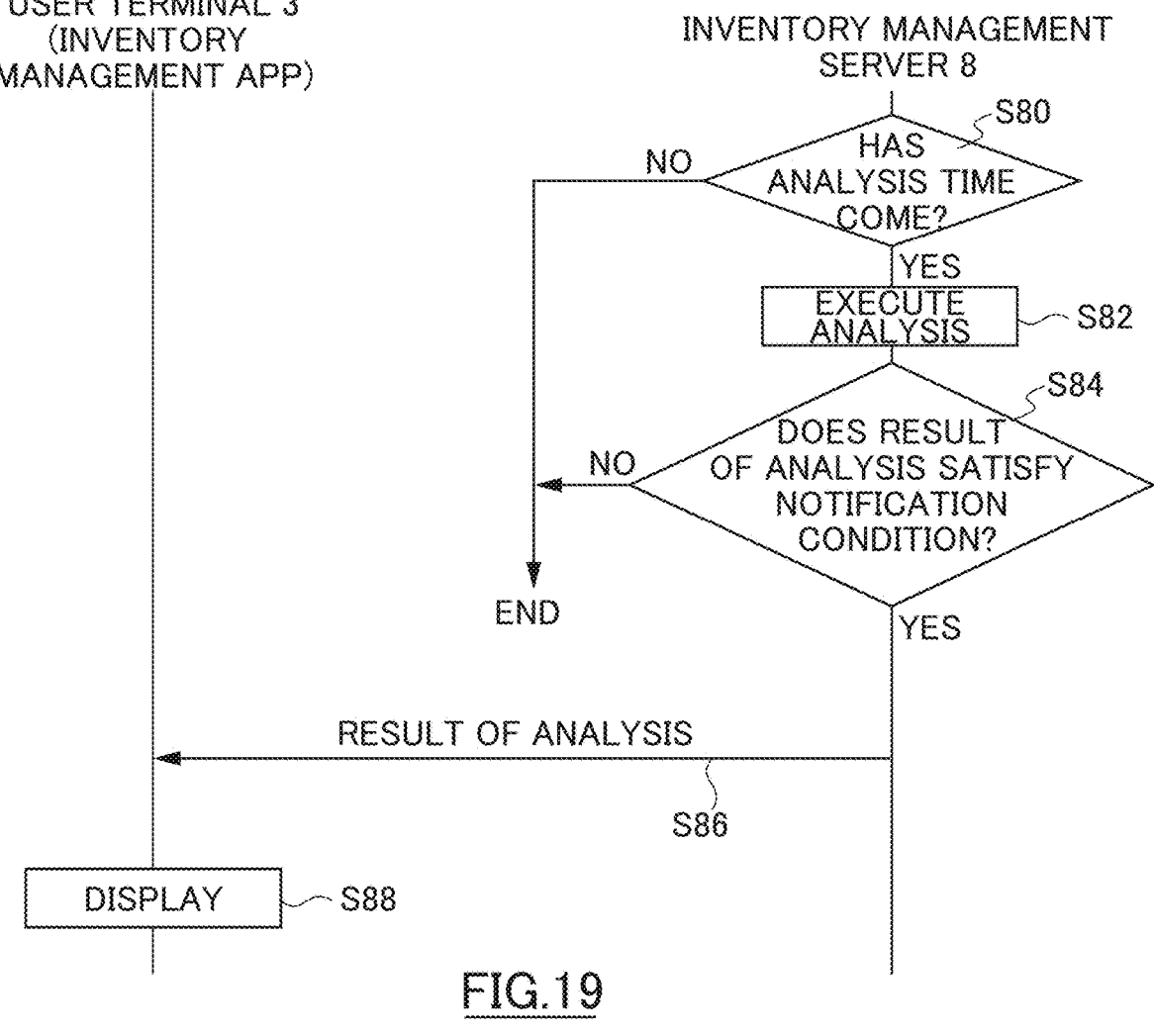
FIG. 19 is a sequence chart showing operation of the product inventory management system of an embodiment.

An example of operation of the product inventory management system of this embodiment is shown in FIG. 19.

FIG. 19 shows a sequence chart of an analysis process that may be periodically executed, for example. When the analysis time has come (step S80: YES), the inventory management server 8 executes the analysis process (step S82). The contents of the analysis process may be, but not limited to, for example:

whether diet is unbalanced;

whether calorie consumption (intake) is appropriate:

whether salt intake is too great; or whether there is a food that has passed its best-by date.

Note that, for example, in order to determine whether calorie consumption or salt intake is appropriate, an average consumption or an average intake for the same age as a user is preferably used as a reference.

Data of calorie consumption can be obtained, for example, by accessing a database that contains a calorie value per unit weight of each product. In addition, a salt intake can be calculated by accessing a database that contains a salt content per unit weight of each product or by obtaining consumption information corresponding to change in weight of ajar containing salt, as shown by the example in FIG. 15.

The inventory management server 8 determines whether the result of analysis in step S82 satisfies a notification condition for notifying a user. If the notification condition is satisfied (step S84: YES), the inventory management server 8 transmits the result of analysis to the inventory management application of the user terminal 3 (step S86). Upon receiving the result of analysis, the user terminal 3 causes the display 34 to show it (step S88).

Although the notification condition in step S84 is not limited, notification is performed when there is a tendency different from usual or in other situations. For example, the notification condition may be: a condition that the amount of a certain product in stock is small; a condition that the amount in stock is not changed; a condition that the number of types of products that have passed their best-by dates is a predetermined number or greater; a condition that an average calorie consumption or an average salt intake is outside an appropriate range; or a condition that the consumption amount of vegetables is a predetermined value or less. A notification is thus made when the amount in stock or the amount of consumption of a certain user is different from usual, whereby it is possible to indirectly watch the health condition of, for example, a user living alone far away from the user's family (e.g., an elderly parent or a child living alone).

Figures 20A, 20B:
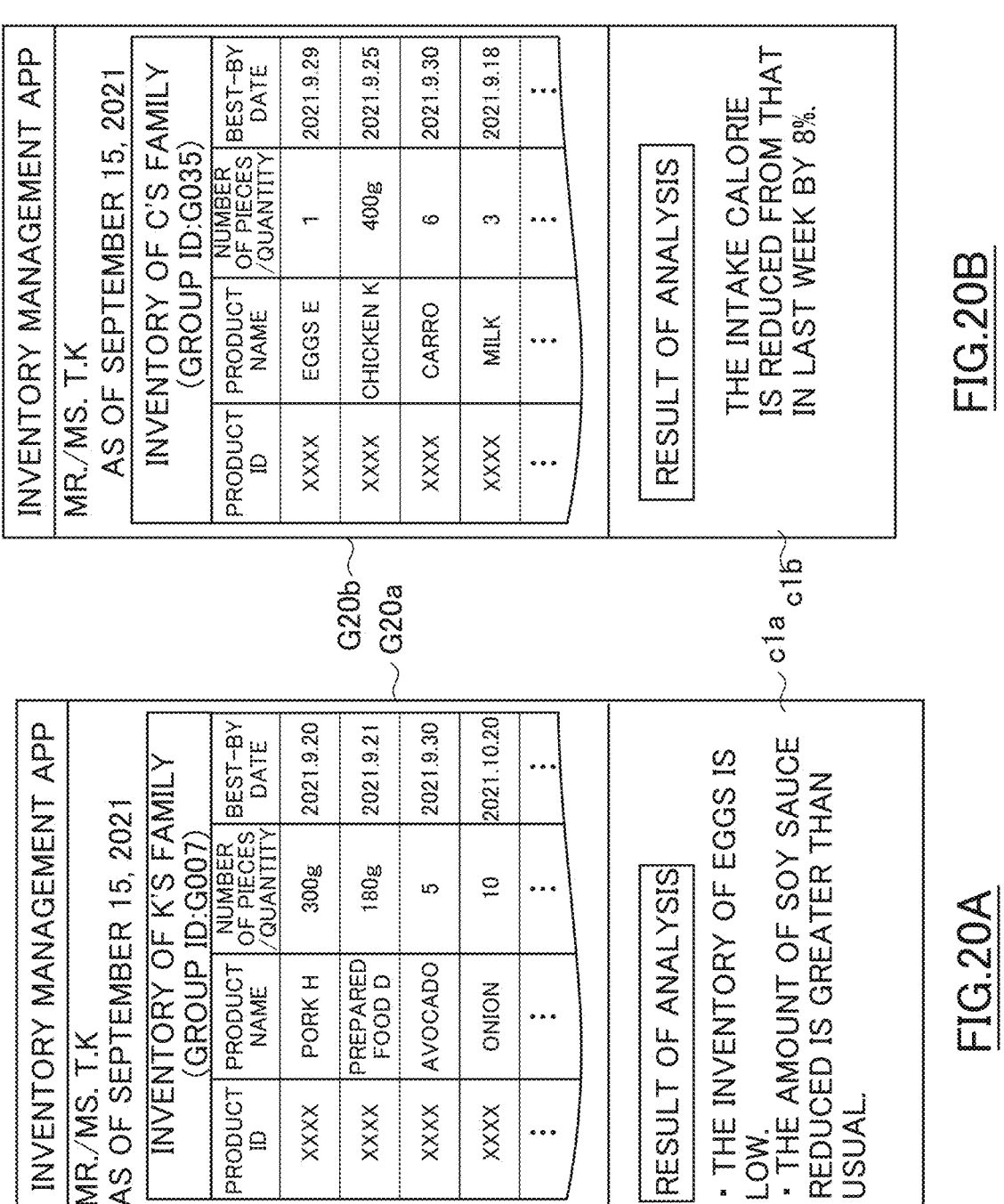
FIG. 20A shows an example of a screen of the inventory management application of the user terminal.
FIG. 20B shows an example of a screen of the inventory management application of the user terminal.

FIGS. 20A and 20B each show an example of a screen displayed in step S88 in FIG. 19.

A screen G20a in FIG. 20A contains an analysis content C1a. The analysis content C1a is a content such as "The inventory of eggs is low," which is notified when the amount of a certain product in stock is small, and it is also a content such as "The amount of soy sauce reduced is greater than usual," which is notified when a salt intake is greater than a normal average intake.

A screen G20b in FIG. 20B contains an analysis content C1b. The analysis content C1b is a content such as "The intake calorie is reduced from that in last week by 8%," which is notified when the intake calorie is greatly varied from a previous one.

In the product inventory management system of this embodiment, the control unit 81 of the inventory management server 8 functions as an updating unit that updates the inventory data of a certain user of the user inventory database, based on consumption information acquired from the user terminal 3. The analyzing unit 814 of the control unit 81 analyzes consumption status of the user based on the inventory data. This enables analyzing consumption status of a user from increase and decrease in the inventory data of an individual user. The user can be motivated to improve the user's daily diet by obtaining the result of analysis.

In addition, in the product inventory management system of this embodiment, the control unit 81 of the inventory management server 8 functions as an updating unit that updates the inventory data of a group containing a user having the user terminal 3, based on consumption information acquired from the user terminal 3. The analyzing unit 814 of the control unit 81 analyzes consumption status of the group based on the inventory data of the group. This enables analyzing consumption status per group from increase and decrease in the inventory data per group. For example, the user can be motivated to improve the user's family daily diet by obtaining the result of analyzing consumption status per family.

The control unit 81 of the inventory management server 8 may function as a notification unit that notifies the user terminal 3 when the result of analysis performed by the analyzing unit 814 satisfies a predetermined condition, as shown by steps S84 and S86 in FIG. 19. The result of analysis to be notified is limited to that satisfying a predetermined condition necessary for a user to maintain health, which prevents complication of notification of the result of analysis.

(5) Modification Examples of Embodiments

Next, the product inventory management system of each of modification examples of the embodiments will be described.

(5-1) First Modification Example

The user inventory database contains best-by-date information on each product held by a user, and therefore, the inventory management server 8 may suggest a menu of dishes that can be cooked by using one or more products having close best-by dates. For example, the inventory management server 8 stores a dish database indicating correspondence relationships between one or more products and dish menus using the one or more products as ingredients. The control unit 81 of the inventory management server 8 refers to the inventory data of a target user to determine one or more products having close best-by dates. The control unit 81 then refers to the dish database to determine a dish menu that can be cooked by using one, some, or all of the determined one or more products and notifies the inventory management application of the target user.

The inventory management application may be configured so that a user is able to order a product from a store when the user does not have the product among one or more products required for the determined dish menu.

(5-2) Second Modification Example

The inventory management application can be configured to make a suggestion for maintaining health of a user in cooperation with a wearable device such as a smart watch, which is carried by the user.

The wearable device sequentially obtains data related to calorie consumption caused by exercise of the user and transmits the data to a server for the wearable device. The server for the wearable device provides data related to calorie consumption recorded in association with the user, to the inventory management server 8.

The inventory management server 8 performs analysis based on consumption information (information on intake calorie) of the user and information on calorie consumption of the user. The inventory management server 8 then notifies the result of analysis (e.g., excessive calorie intake or insufficient exercise) to the inventory management application of the user. In this case, the inventory management server 8 may transmit a suggestion message for maintaining health, such as a necessary amount of exercise, to the inventory management application of the user based on the result of analysis.

(5-3) Third Modification Example

Next, a third modification example will be described.

A case of obtaining a product ID and best-by date information from a product by reading code information on the product is described in relation to each of the foregoing embodiments; however, the obtaining method is not limited thereto.

A product ID and best-by date information can be obtained from a product by another method as follows: a product ID and best-by date information are obtained from a radio tag that is attached to a product, a shelf label, or a packaging material of a product, a radio tag disposed close to a product, or the like. In this case, any communication method (e.g., a communication protocol and a frequency to be used) can be used in receiving information. Examples of the communication method include radio frequency identification (RFID), such as near field communication (NFC), Bluetooth (registered trademark), and Bluetooth (registered trademark) Low Energy (BLE).

It is assumed that an NFC tag that registers a product ID and best-by date information on a product is attached to, for example, the product or a shelf label, and an NFC reader is mounted on the user terminal 3. In this case, in response to a user bringing his or her own user terminal 3 close to the product, the NFC reader of the user terminal 3 receives the product ID and the best-by date information on the product from the NFC tag of the product. The store application of the user terminal 3 transmits a price inquiry that contains the received product ID and best-by date information on the product, to the store server 5. The store server 5 that has received the price inquiry determines an offered price of the product and returns information indicating the offered price, to the store application, in the same manner as in the above-described embodiments.

A product ID of a product can be also identified from an image of appearance of the product. In one example in which the user terminal 3 has an imaging unit, an image of a product that is obtained by the imaging unit may be transmitted to the store server 5 by the store application. The store server 5 identifies the product ID of the product from the obtained image of the product. A product ID can be identified by employing artificial intelligence using a learned model. In this case, an image of a product is an example of product information. Here, the store server 5 may access a database in which a product ID and best-by date information on a product are associated with each other, to acquire best-by date information corresponding to the identified product ID.

A product ID and best-by date information on a product may be acquired by using a combination of a plurality of pieces of information obtained from the product. Specifically, a product ID and best-by date information on a product can be acquired by using a combination of at least two or more pieces of information such as code information and textual information obtained from the product, a shelf label, or the like, information obtained from a radio tag, an image of appearance of the product, and identification information for identifying an individual product.

Although embodiments of the information processing system, the information processing device, the information processing method, and the program of the present invention are described above, the present invention should not be limited to the foregoing embodiments. In addition, the embodiments described above can be variously modified and altered within the scope not departing from the gist of the present invention. For example, respective technical characteristics described in relation to the foregoing embodiments and modification examples can be combined with one another as appropriate, unless technical contradiction occurs.

In the embodiments and the modification examples described above, at least one of the functions of the store server 5 and the inventory management server 8 may be implemented by software of the user terminal 3, and at least one of the functions of the user terminal 3 may be implemented by software of the store server 5 or the inventory management server 8. In addition, each of the functions of the user terminal 3 and each of the functions of the store server 5 and the inventory management server 8 may be implemented by allocating them to the user terminal 3, the store server 5, and the inventory management server 8, as necessary. The functions to be executed by the store server 5 and the inventory management server 8 may be executed by allocating them to a plurality of devices.

The information processing system of the present invention can be employed, for example, when a purchase is made based on product information and expiration information by using an online sales system, or when a purchase is made by using a system of selling by measure. For example, when a user has purchased by using online sales, the inventory management server acquires the purchase data of the user from a server that provides the online sales service, to update the user inventory database. In addition, also in the case in which a user has purchased a product in a store by using a system of selling by measure, it is possible to make a payment by using the store application, based on code information affixed on the product when it is weighed to be sold. A system in which the inventory management server updates the user inventory database as in the case shown in FIG. 6, can be established.

The present invention is related to Japanese Patent Application No. 2021-52065 filed with the Japan Patent Office on Mar. 25, 2021, the entire contents of which are incorporated into this specification by reference.

The invention claimed is:

1. An information processing system comprising:
a user terminal configured to be carried by a user;
an information processing device being capable of communicating with the user terminal; and
a radio tag comprising a weight sensor, the radio tag being configured to acquire a weight of a product and transmit the weight of the product to the user terminal;
the user terminal comprising:
a display,
an imaging unit configured to capture an image including code information attached to the product,
a code reader configured to decode, from the code information, product information identifying the product and expiration information indicating an expiration date of the product, and
a processor configured to:
cause the display to show the product information and the expiration date of the product,
transmit a payment request for the product including the product information to the information processing device in response to a request by the user, the payment request including the product information of the product based on a selection of the product by the user, and
in response to receiving product inventory information from the information processing device, cause the display to show the product inventory information associated with the user, the product inventory information including the product information and the expiration information, and
acquire consumption information on a consumption amount of the product contained in the product inventory information based on a value of the weight that is acquired by the radio tag;
the information processing device comprising a processor configured to:
acquire the product information and the expiration information based on purchase of the product in response to the payment request from the user terminal, as the product inventory information associated with the user,
in response to the request for product inventory information from the user terminal, provide the product inventory information associated with the user to the user terminal,
update the product inventory information based on the consumption information that is acquired from the user terminal, and
analyze a consumption status of the user based on the product inventory information.

2. The information processing system according to claim 1, wherein:
the processor of the information processing device is further configured to:
register one or a plurality of users as a group,
register product information and expiration information acquired from each user in the group by the processor of the information processing device, as product inventory information on the group, and
based on a request from a user in the group, provide the product inventory information on the group, to the user terminal of the user in the group.

3. The information processing system according to claim 2, wherein:
the processor of the information processing device is further configured to:
associate a plurality of groups that are registered by the processor of the information processing device, with each other, and
in a state in which a first group and a second group are associated with each other by the processor of the information processing device, provide product inventory information on the second group to a user of the first group.

4. The information processing system according to claim 3, wherein
the processor of the information processing device is further configured to:
update the product inventory information on a group including a user who carries the user terminal, based on the consumption information that is acquired from the user terminal, and
analyze consumption status of the group, based on the product inventory information on the group.

5. The information processing system according to claim 1, wherein the processor of the information processing device is further configured to notify the user terminal in a case in which a result of analysis performed by the processor of the information processing device satisfies a predetermined condition.

6. An information processing method that is performed between a user terminal configured to be carried by a user and an information processing device being capable of communicating with the user terminal, the method comprising:

capturing, by the user terminal, an image including code information attached to a product;
decoding, by the user terminal, from the code information, product information identifying the product and expiration information indicating an expiration date of the product;
causing, by the user terminal, a display of the user terminal to show the product information and the expiration date of the product;
transmitting, by the user terminal, a payment request for the product including the product information to the information processing device in response to a request by the user, the payment request including the product information of the product based on a selection of the product by the user, and
acquiring, by the user terminal, consumption information on a consumption amount of each product contained in the product inventory information based on a value of a weight that is acquired by a radio tag comprising a weight sensor;
acquiring, by the information processing device, the product information and the expiration information based on purchase of the product in response to the payment request from the user terminal, as product inventory information associated with the user;
in response to a request for the product inventory information from the user terminal, providing, by the information processing device, the acquired product inventory information associated with the user to the user terminal;
causing, by the user terminal, the display of the user terminal to show the product inventory information associated with the user;
updating, by the information processing device, the product inventory information based on the consumption information that is acquired from the user terminal; and
analyzing, by the information processing device, consumption status of the user based on the product inventory information.

7. The information processing system according to claim 4, wherein the processor of the information processing device is further configured to notify the user terminal in a case in which a result of analysis performed by the processor of the information processing device satisfies a predetermined condition.

8. The information processing method according to claim 6, further comprising:
registering, by the information processing device, one or a plurality of users as a group; and
registering, by the information processing device, product information and expiration information acquired from each user in the group, as product inventory information on the group, wherein
the providing includes, based on a request from a user in the group, providing the product inventory information on the group, to the user terminal of the user in the group.

9. The information processing method according to claim 8, further comprising:
associating, by the information processing device, a first group and a second group with each other, each of the first group and the second group having been registered by the registering, wherein
the providing includes providing product inventory information on the second group to a user of the first group.

10. The information processing method according to claim 9, further comprising:

updating, by the information processing device, the product inventory information on a group including a user who carries the user terminal, based on the consumption information that is acquired from the user terminal; and analyzing, by the information processing device, consumption status of the group, based on the product inventory information on the group.

11. The information processing method according to claim 6, further comprising notifying, by the information processing device, the user terminal in a case in which a result of analysis performed by the analyzing satisfies a predetermined condition.

12. The information processing method according to claim 10, further comprising notifying, by the information processing device, the user terminal in a case in which a result of analysis performed by the analyzing satisfies a predetermined condition.

13. The information processing system according to claim 1, wherein the processor of the information processing device is configured to update the product information and the expiration information corresponding to each product in response to subsequent payment requests from the user terminal as product inventory information associated with the user, and store the product inventory information in association with a product identification code corresponding to the user.

14. The information processing method according to claim 6, further comprising updating the product information and the expiration information corresponding to each product in response to subsequent payment requests from the user terminal as product inventory information associated with the user, and storing the product inventory information in association with a product identification code corresponding to the user.

15. The information processing system according to claim 1, wherein acquiring product information of the product includes scanning a code on a label of the product and acquiring the expiration information from the information processing device.

16. The information processing system according to claim 1, wherein the processor of the information processing device is configured to update the product information and the expiration information corresponding to a product already paid for in response to the payment request from the user terminal, as product inventory information associated with the user, for each user identification information for identifying the user of the user terminal, and acquire the updated product inventory information associated with the user.

17. An information processing system comprising:

a user terminal configured to be carried by a user and including a display and a processor;

at least one store server including a processor;

an inventory management server including a processor and a user inventory database; and a radio tag comprising a weight sensor, the radio tag being configured to acquire a weight of a product and transmit the weight of the product to the user terminal;

wherein the processor of the user terminal is configured to:

acquire product identification information and expiration information of at least one product by scanning a code provided on a label attached to each product of the at least one product, transmit a payment request for the product including the product information to the store server in response to a request by the user, the payment request including the product information of the product based on a selection of the product by the user, transmit a request for product inventory information to the inventory management server, in response to receiving the product inventory information from the information processing device, cause the display to show the product inventory information associated with the user, the product inventory information including the product information and expiration information of the at least one product, which is acquired from the inventory management server, and acquire consumption information on a consumption amount of the product contained in the product inventory information based on a value of the weight that is acquired by the radio tag;

wherein the processor of the inventory management server is configured to:

acquire from the at least one store server the product identification information and the expiration information corresponding to at least one product already paid for in response to the payment request from the user terminal, as the product inventory information associated with the user, update the user inventory database with the product inventory information to reflect the purchase of the product already paid for, in response to the request for product inventory information from the user terminal, provide the product inventory information associated with the user to the user terminal, update the product inventory information based on the consumption information that is acquired from the user terminal, and analyze a consumption status of the user based on the product inventory information.

* * * * *